US008109813B2

(12) United States Patent
Sakakibara

(10) Patent No.: US 8,109,813 B2

(45) Date of Patent: Feb. 7, 2012

(54) THIN AIR OUTLET STRUCTURE OF VEHICLE AIR CONDITIONER

(75) Inventor: Kimio Sakakibara, Nishio (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 505 days.

(21) Appl. No.: 12/305,732

(22) PCT Filed: Jun. 18, 2007

(86) PCT No.: PCT/JP2007/062252

§ 371 (c)(1), (2), (4) Date: Dec. 19, 2008

(87) PCT Pub. No.: WO2007/148658

PCT Pub. Date: Dec. 27, 2007

(65) Prior Publication Data

US 2010/0011799 A1 Jan. 21, 2010

(30) Foreign Application Priority Data

Jun. 20, 2006 (JP) ................................ 2006-170559

(51) Int. Cl.
*B60H 1/34* (2006.01)
*B60H 1/00* (2006.01)

(52) U.S. Cl. .......................... 454/143; 454/284; 62/426

(58) Field of Classification Search .................. 454/284, 454/143, 358; 62/426; *B60H 1/34*
See application file for complete search history.

(56) References Cited

U.S. PATENT DOCUMENTS 1,170,308 A * 2/1916 Mertz ............................ 96/356
2,588,547 A * 3/1952 Lee .............................. 123/459

(Continued)

FOREIGN PATENT DOCUMENTS

DE 30 01 163 7/1981

(Continued)

OTHER PUBLICATIONS

Yoshihiko, JP 2002-321524 A machine translation, Nov. 5, 2002.*

(Continued)

*Primary Examiner* — Steven B McAllister
*Assistant Examiner* — Phillip E Decker
(74) *Attorney, Agent, or Firm* — Finnegan, Henderson, Farabow, Garrett & Dunner, LLP

(57) ABSTRACT

A thin air outlet structure to a vehicle compartment exhibiting excellent directivity while ensuring sufficient volume and velocity of air conditioning air stream. In the air outlet structure 10, delivery direction of the air stream can be altered by altering the posture of a pair of fins 16 provided at a middle portion 13 in the flow direction in a case 12. Since the air outlet 20 does not require a plurality of fins for altering the delivery direction, the air outlet 20 can be made thin. Since the delivery direction of the air stream can be altered by means of the pair of fins 16 and the number of the fins 16 is small, flow of air is not impeded in the flow path within the case 12 and effective cross-sectional area of the flow path within the case 12 can be ensured. Consequently, sufficient volume and velocity of air stream can be secured. Furthermore, the size for each blade of the fins 16 can be increased by the decrease made in the number of fins 16. The air conditioning air stream excellent in directivity can be obtained.

3 Claims, 22 Drawing Sheets

U.S. PATENT DOCUMENTS

| | | | | |
|---|---|---|---|---|
| 2,814,448 | A * | 11/1957 | Schutt | 237/8 A |
| 2,894,443 | A * | 7/1959 | Rasmussen | 454/127 |
| 3,949,656 | A * | 4/1976 | Lohmann | 454/316 |
| 4,796,518 | A * | 1/1989 | Murray | 454/155 |
| 6,254,475 | B1 * | 7/2001 | Danieau et al. | 454/156 |
| 6,800,023 | B2 * | 10/2004 | Demerath | 454/155 |
| 7,201,650 | B2 * | 4/2007 | Demerath et al. | 454/154 |
| 7,229,348 | B2 * | 6/2007 | Shibata | 454/155 |
| 2004/0224625 | A1 * | 11/2004 | Demerath et al. | 454/125 |
| 2005/0239391 | A1 * | 10/2005 | Shibata | 454/155 |
| 2008/0081550 | A1 * | 4/2008 | Shibata et al. | 454/155 |

FOREIGN PATENT DOCUMENTS

| | | | |
|---|---|---|---|
| JP | 54-154146 | | 12/1979 |
| JP | 56-141938 | | 10/1981 |
| JP | 59-38633 | | 3/1984 |
| JP | 60-159939 | | 10/1985 |
| JP | 61-192245 | | 11/1986 |
| JP | 63-254344 | | 10/1988 |
| JP | 01278822 | A * | 11/1989 |
| JP | 4-95257 | | 8/1992 |
| JP | 5-66447 | | 9/1993 |
| JP | 05-240496 | | 9/1993 |
| JP | 5-332607 | | 12/1993 |
| JP | 7-315035 | | 12/1995 |
| JP | 11-83150 | | 3/1999 |
| JP | 2002-321524 | | 11/2002 |
| JP | 2005-306224 | | 11/2005 |

OTHER PUBLICATIONS

Masamitsu et al, JP 11-83150 A machine translation, Mar. 26, 1999.*

Extended European Search Report for EP Appl. No. 07745483.3 dated Feb. 17, 2010.

Notice of Reasons for Rejection for JP 2006-170559 dated Jun. 1, 2010.

* cited by examiner 10
12
14
16(16A)
16(16B)
28
30
32
34
36
38
38
38
40
42
44
46
48
50
50
52
54
56
56
58
58
60
60
64
66
66
66
68
68
70
Up
Fr
Out A-A
10
12
13
16D
R5
82
R9
16D
20
Y
Y'
Y
26C
R6
74
66
66
R10
X2
16(16A)
16(16B)
50
16C
16C
74
50
R7
R8
48
70
R8
R7
26
26B
24
26A
18
80
Up
Fr A-A
10
12
24
80
18
82
20
X
X1
72
26C
26B
26A
26
13
16D
16(16B)
16C
16(16A)
66
50
48
70
R5
R6
R7
R8
R9
R10
Up
Fr A-A
10
12
24
76
20
82
Z
26C
R5
R6
16(16A)
R10
R9
16C
R7
R8
50
70
X1
48
50
R8
R7
16C
16(16B)
66
16D
13
26B
26
26A
80
18
Up
Fr B-B
10
12
14
30
32
34
36
38
40
40A
40B
40C
42
44
46
48
50
52
54
64
82
84
R1
R2
R3
R4
C
D

C-C

D-D 20
24
82
22
E
18
110
E
150
84
142
154
144
114
12
148
130
152
156
146
13
26
28
Up
Fr
Out

E-E
110
12
24
174
116(116A)
166
R15
116D
R16
166
116(116B)
174
13
26B
26
26A
26C
20
Y
Y
82
80
18
Up
Fr

E-E
110
12
24
18
80
82
20
X
172
R16
R15
166
166
116D
116(116A)
116(116B)
13
26C
26B
26
26A
Up
Fr

E-E
110
12
24
20
Z
82
176
166
116(116A)
R15
R16
116D
166
116(116B)
13
26B
26
26C
26A
18
80
Up
Fr

F-F
UPPERMOST POSITION
UP-DOWN INTERMEDIATE POSITION
LOWERMOST POSITION
142
R12
R11
116(116B)
156A
156B
156
R17
146
R18
162
Up
Fr

20
G
24
82
22
18
H
210
84
G
242
246
230
243
12
214
248
247
250
232
13
268
244
28
270
245
26
H
Up
Fr
Out 210
216(216B)
266
216C
216C
266
216(216A)
268
270
230
232
234
236
246
247
248
250
242
243
244
245
214
Up
Fr
Out

G-G
210
12
24
274
216(216B)
216(216A)
274
216(216A)
R27
R28
R27
R28
82
Y
Y
20
26C
13
26B
26
26A
80
Up
Fr

G-G
210
12
24
216(216A)
216(216B)
216
216D
82
R27
R28
X
20
26C
272
13
26B
26
26A
80
Up
Fr

G-G
210
12
24
20
82
Z
R28
R27
216(216A)
216(216B)
276
26E
216D
26C
13
26B
26
26A
26D
80
Up
Fr

H-H
210
12
82
84
R21
246
230
R22
242
232
247
243
214
268
248
244
R23
R24
R25
R26
250
270
245
Up
Fr

THIN AIR OUTLET STRUCTURE OF VEHICLE AIR CONDITIONER

CROSS-REFERENCE TO RELATED APPLICATIONS

This application is a national phase application of International Application No. PCT/JP2007/062252, filed Jun. 18, 2007, and claims the priority of Japanese Application No. 2006-170559, filed Jun. 20, 2006, the contents of both of which are incorporated herein by reference.

1. Technical Field

The present invention relates to an air outlet structure of an air conditioner, and in particular to an air outlet structure of an air conditioner configured to enable the delivery direction of the air conditioning air stream blown out from the air outlet to be altered.

2. Related Art

Known air outlet structures of air conditioners of this type are described in Japanese Patent Application Laid-Open (JP-A) Nos. 2005-306224 and 5-332607, and Japanese Utility Model Application Laid-Open (JP-U) 4-95257. An example of an air conditioning resistor is described in JP-A No. 2005-306224, an opened retainer being provided at the downstream end thereof as an air outlet capable of blowing an air conditioning air stream out into a vehicle compartment. Plural fins are provided at the outlet of the retainer to the vehicle compartment. Configuration is made such that the angle of the plural fms is altered, with the direction of the air stream from the air outlet to the vehicle compartment determined by the angle of the plural fins.

DISCLOSURE OF THE INVENTION

Subject to be Addressed by the Invention

However, since there are plural fins positioned at the outlet out to the vehicle compartment in the air outlet structure provided in the above manner, the actual opening area of the outlet to the vehicle compartment is reduced by the fins. In addition, when the fins are angled to the maximum extent so as to alter the air stream direction, a region is formed at the outlet where the air stream dwells due to the fin from the plural fins disposed in the vicinity of the side wall of the outlet. Consequently the volume and velocity of the air stream become insufficient due to the reduction in the actual opening area of the outlet to the vehicle compartment.

The outlet of the retainer to the vehicle compartment needs to be widened in order to secure the volume and velocity of the air stream. However it becomes difficult to provide a thin structure for the outlet, in the vehicle up-down and left-right directions, if the outlet to the vehicle compartment is increased. In particular, since there is a recent trend toward the use of instrument panels with a slant (inclination), there is a desire for an air outlet to the vehicle compartment having a thin structure, increasing the design flexibility of the instrument panel, yet having excellent directivity of the air stream.

The present invention is made in consideration of the above circumstances and provides an air outlet structure for an air conditioner, securing sufficient volume and velocity of the air stream and exhibiting excellent directivity while enabling provision a thin air outlet structure to a vehicle compartment.

Method of Addressing the Subject

In order to address the above subject, a first aspect of the present invention is an air conditioner air outlet structure including: a flow path member, opened at the downstream end thereof as an air outlet for an air conditioning air stream to a vehicle compartment; a pair of fins, provided within the flow path member at a middle portion in the flow direction of the air conditioning air stream such that the posture of the pair of fins is alterable with respect to the flow path member; and a delivery direction altering part that is coupled to operation of an operation portion and changes the posture of at least one fin of the pair of fins. The flow path member is provided with a top wall and a bottom wall, the top wall is inclined downward on progression toward the flow direction downstream side of the air conditioning air stream, the bottom wall is inclined upward on progression toward the flow direction downstream side of the air conditioning air stream, and at least a portion of the fins is provided in a position corresponding to the inclined portions of the top wall and the bottom wall.

In the above described air conditioner air outlet structure, when an air conditioning air stream blows out from an air conditioner this air stream blows through the flow path member and out from the air outlet opening to the vehicle compartment. The pair of fins is provided within the flow path member at a middle portion in the flow direction of the air stream such that the posture of the pair of fins is alterable with respect to the flow path member. The posture of the pair of fins is changed by the delivery direction altering part that is coupled to operation of an operation portion. Consequently when the posture of the pair of fins has been changed by moving by operating the operation portion the air stream blowing out of the air conditioner from the air outlet into the vehicle compartment blows out in a direction according to the posture of the pair of fins.

In addition, the top wall of the flow path member is inclined downward and the bottom wall thereof is inclined upward, and the fins are provided in a position corresponding to the inclined position of the top wall and the bottom wall. Consequently flow paths for the air stream can be formed along the top wall and the fins, or along the bottom wall and the fins.

According to the above described aspect the delivery direction can be altered by altering the posture of the pair of fins provided within the flow path member at the middle portion in the flow direction. Consequently the actual opening area of the air outlet to the vehicle compartment can be secured since the air outlet of the flow path member does not require plural fins for altering the delivery direction. A thinner structure than before for the air outlet to the vehicle compartment is thereby enabled. By the air outlet to the vehicle compartment being a thinner structure than before, this also enables, for example, design flexibility of the instrument panel to be raised.

In addition the delivery direction of the air stream can be altered by the pair of fins, and since the number of fins is small, the flow of the air stream in the flow path within the flow path member is not impeded, and the effective cross-sectional area of the flow path within the flow path member can be secured. In addition, since the actual area of the air outlet to the vehicle compartment can be secured in the manner stated above, sufficient volume and velocity of the air conditioning air stream can be secured. The size of each blade can also be increased by reducing the number of fins. Thereby, an air stream excellent in directivity can be obtained. Also flow paths for the air stream can be formed along the top wall and the fins, or along the bottom wall and the fins, thereby enabling an air stream with even more excellent directivity to be obtained.

In the above described aspect the delivery direction altering part may be configured to include a first drive section that swingably moves the pair of fins in the same direction when in receipt of operation force from the operation portion, and a second drive section that changes the angle formed between the pair of fins according to the moving angle of the pair of fins when the pair of fins are swingably moved in the same direction by the first drive section.

According to the above described aspect the pair of fins are swingably moved in the same direction by the first drive section when operation force is input from the operation portion. In addition the angle formed between the pair of fins is changed by the second drive section according to the moving angle of the pair of fins when the pair of fins is swigably moved in the same direction by the first drive section. The delivery direction of the air conditioning air stream is altered by altering the posture of the pair of fins in this manner. The delivery direction of the air conditioning air stream can be altered by cooperation of the pair of fins with the first drive section and the second drive section in this manner.

In the above described aspect the delivery direction altering part may be configured to include: a rotation body that rotates when in receipt of operation force from the operation portion; a first drive section that utilizes rotation force from the rotation body within a first rotation range of the rotation body to swingably move one fin of the pair of fins; and a second drive section that utilizes rotation force from the rotation body within a second rotation range different from the first rotation range of the rotation body to swingably move the other fin of the pair of fins.

According to the above described aspect, the rotation body is rotated when operation force is input thereto from the operation portion. If this occurs when the rotation body is within the first rotation range then one fin of the pair of fins is swingably moved by the first drive section. If this occurs when the rotation body is within the second rotation range then the other fin of the pair of fins is swingably moved by the second drive section. The delivery direction of the air conditioning air stream is altered by altering the posture of the pair of fins in this manner. The delivery direction of the air conditioning air stream can be altered by cooperation of the pair of fins with the first drive section and the second drive section in this manner.

In the above described aspect, the delivery direction altering part may be configured to include a first drive section that swingably moves one fin of the pair of fins when in receipt of operation force from the operation portion, and to include a second drive section that couples to the first drive section and swingably moves the other fin of the pair of fins.

According to the above described aspect, one fin of the pair of fins is swingably moved by the first drive section when operation force is input from the operation portion. The second drive section is operated coupled to the first drive section and the second drive section swingably moves the other fin of the pair of fins. The delivery direction of the air conditioning air stream is altered by altering the posture of the pair of fins in this manner. The delivery direction of the air conditioning air stream can be altered by cooperation of the pair of fins with the first drive section and the second drive section in this manner.

A second aspect of the present invention is an air conditioner air outlet structure including: a flow path member, opened at the downstream end thereof as an air outlet for an air conditioning air stream to a vehicle compartment; a rotation body that rotates when in receipt of operation force from an operation portion; a pair of pinions, each disposed at a position a distance away from the rotational axis of the rotation body and each rotatably supported on the rotation body; a rack that is disposed between the pair of pinions, and that meshes with the pair of pinions and advances and retreats between the pair of pinions along with the rotation of the rotation body; and a pair of fins disposed at a middle portion in the flow direction of the air conditioning air stream within the flow path member, each of the pair of fins being provided to the respective pinion of the pair of pinions.

According to the above described aspect, when operation force is input from the operation portion the rotation body is rotated. When this occurs the pair of fins is provided at the rotation body via the pair of pinions. Consequently the pair of fins is swingably moved in the same direction by rotation of the rotation body. The rack advances and retreats between the pair of pinions when the pair of fins swingably moves in the same direction. The pair of pinions is consequently rotated in mutually different directions and the angle formed between the pair of fins, each provided at the respective pinion of the pair of pinions, changes according to the rotation angle of the rotation body. The delivery direction of the air conditioning air stream is changed by altering the posture of the pair of fins in this manner. The delivery direction of the air conditioning air stream can be altered by cooperation of the pair of fins with the first drive section and the second drive section in this manner.

According to the above described aspect, the pair of fins is provided at the middle portion in the flow direction within the flow path member. A change can be made in the delivery direction of the air conditioning air stream by altering the posture of the pair of fins. Consequently the actual opening cross-sectional area of the air outlet to the vehicle compartment can be secured since there is no necessity to provide at the air outlet of the flow path member plural fins for changing the delivery direction. A thinner structure than before for the air outlet to the vehicle compartment is thereby enabled. By the air outlet to the vehicle compartment being a thinner structure than before, this also enables, for example, the degrees of freedom for design of the instrument panel to be raised.

In addition the delivery direction of the air conditioning air stream can be altered by the pair of fins, and since the number of fins is small, the flow of the air conditioning air stream in the flow path within the flow path member is not impeded, enabling the effective cross-sectional area of the flow path within the flow path member to be secured. In addition, since the actual opening cross-sectional area of the air outlet to the vehicle compartment can be secured as described above, this enables a sufficient volume and velocity of the air conditioning air stream to be secured. However, by reducing the number of fins the size for each blade can be increased. This thus enables an air conditioning air stream also having excellent directivity to be obtained.

A third aspect of the present invention is an air conditioner air outlet structure including: a flow path member, opened at the downstream end thereof as an air outlet for an air conditioning air stream to a vehicle compartment; a rotation body that rotates when in receipt of operation force from an operation portion; a pair of engaging portions provided integrally to the rotation body; a pair of arm members respectively engaged to the pair of engaging portions at mutually different rotation ranges of the rotation body, the pair of arm members rocking; a pair of fins, provided at a middle portion in the flow direction of the air conditioning air stream within the flow path member, each of the pair of fins provided at the respective arm of the pair of arm members.

According to the above described aspect, the rotation body rotates when operation force is input from the operation portion. In the first rotation range one of the pair of arm members is engaged with one of the pair of engaging portions and rocks. There is one fin of the pair of fins provided at this one of the pair of arm members. Consequently in the first rotation range of the rotation body this one fin of the pair of fins swingably moves along with the rocking of this one of the pair of arm members. In a second rotation range different from the first rotation range of the rotation body the other of the pair of arm members is engaged with the other of the pair of engaging portions and rocks. The other fin of the pair of fins is provided at this other one of the pair of arm members. Consequently in the second rotation range of the rotation body this other fin of the pair of fins swingably moves along with the rocking of this other of the pair of arm members. The delivery direction of the air conditioning air stream is altered by altering the posture of the pair of fins in this manner. The delivery direction of the air conditioning air stream can be altered by cooperation of the pair of fins with the first drive section and the second drive section in this manner.

According to the above described aspect, the pair of fins is provided at the middle portion in the flow direction within the flow path member. The delivery direction of the air conditioning air stream can be altered by altering the posture of the pair of fins. Consequently the actual opening cross-sectional area of the air outlet to the vehicle compartment can be secured since there is no necessity to provide at the air outlet of the flow path member plural fins for changing the delivery direction. A thinner structure than before for the air outlet to the vehicle compartment is thereby enabled. By the air outlet to the vehicle compartment being a thinner structure than before, this also enables, for example, the degrees of freedom for design of the instrument panel to be raised.

In addition the delivery direction of the air conditioning air stream can be altered by the pair of fins, and since the number of fins is small, the flow of the air conditioning air stream in the flow path within the flow path member is not impeded, enabling the effective cross-sectional area of the flow path within the flow path member to be secured. In addition, since the actual opening cross-sectional area of the air outlet to the vehicle compartment can be secured as described above, this enables a sufficient volume and velocity of the air conditioning air stream to be secured. However, by reducing the number of fins the size for each blade can be increased. This thus enables an air conditioning air stream also having excellent directivity to be obtained.

A fourth aspect of the present invention is an air conditioner air outlet structure including: a flow path member, opened at the downstream end thereof as an air outlet for an air conditioning air stream to a vehicle compartment; a pair of gears that are meshed together and rotate when in receipt of operation force from an operation portion; a pair of fins, provided at a middle portion in the flow direction of the air conditioning air stream within the flow path member, the pair of fins provided at the respective gears of the pair of gears.

According to the above described aspect, the pair of gears that are meshed together rotate when operation force is input from the operation portion. As this occurs, the pair of fins is provided at the pair of gears. Consequently the fins of the pair of fins swingably move in mutually opposite directions due to rotation of the pair of gears. The delivery direction of the air conditioning air stream can thereby be changed by altering the posture of the pair of fins in this manner. The delivery direction of the air conditioning air stream can be altered by cooperation of the pair of fins with the first drive section and the second drive this manner.

The pair of fins is also provided at a middle portion in the flow direction of the flow path member. The delivery direction of the air conditioning air stream can be altered by altering the posture of the pair of fins. Consequently the actual opening cross-sectional area of the air outlet to the vehicle compartment can be secured since there is no necessity to provide at the air outlet of the flow path member plural fins for changing the delivery direction. A thinner structure than before for the air outlet to the vehicle compartment is thereby enabled. By the air outlet to the vehicle compartment being a thinner structure than before, this also enables, for example, design flexibily of the instrument panel to be raised.

In addition the delivery direction of the air conditioning air stream can be altered by the pair of fins, and since the number of fins is small, the flow of the air conditioning air stream in the flow path within the flow path member is not impeded, enabling the effective cross-sectional area of the flow path within the flow path member to be secured. In addition, since the actual opening cross-sectional area of the air outlet to the vehicle compartment can be secured as described above, this enables a sufficient volume and velocity of the air conditioning air stream to be secured. However, by reducing the number of fins the size for each blade can be increased. This thus enables an air conditioning air stream also having excellent directivity to be obtained.

In the above described aspect the cross-sectional area of the middle portion in the flow direction of the flow path member may be made greater than that of the air outlet.

According to the above described aspect, the cross-sectional area of the middle portion in the flow direction of the flow path member is set greater than that of the air outlet. Consequently this enables the effective cross-sectional area of the flow path within the flow path member to be secured. However, by increasing the cross-sectional area in the direction orthogonal to the axial direction of the pair of fins at the flow direction middle portion, the size per blade and the amount of change in posture of the fins can be increased for the pair of fins disposed in this flow direction middle portion of the flow path member, having a cross-sectional area greater than that of the air outlet. The directivity of the air conditioning air stream can thereby be increased even further.

In the above described aspect, at least one portion of the top wall and the bottom wall profiles may be asymmetric to each other.

According to the above described aspect, at least one portion of the flow path profile formed within the flow path member by the top wall and the fins, or by the bottom wall and the fins, is different on the top wall side to that of the bottom wall side due to at least one portion of the top wall and the bottom wall profiles being asymmetric to each other, and the directivity of the air conditioning air stream can be further raised.

As stated above, the air conditioner air outlet structure of the present invention enables excellent directivity while securing sufficient volume and velocity of the air conditioning air stream, and a thin structure for the air outlet to the vehicle compartment.

BEST MODE OF IMPLEMENTING THE INVENTION

First Exemplary Embodiment

Explanation will first be given of a configuration of an air conditioner air outlet structure 10 according to a first exemplary embodiment of the present invention, with reference to FIG. 1 to FIG. 8.

FIG. 1 to FIG. 8 show the first exemplary embodiment of the present invention. FIG. 1 is a perspective view showing the overall configuration of the air conditioner air outlet structure 10. FIG. 2 is an exploded perspective view showing a configuration of an up-down delivery direction altering mechanism 14 and a pair of fins 16. FIG. 3 to FIG. 5 are cross-sections for explaining the operation of the pair of fins 16 (cross-sections taken on line A-A of FIG. 1). FIG. 6 is a cross-section on line B-B of FIG. 1. FIG. 7 and FIG. 8 are cross-sections of the air outlet structure 10 sectioned on lines C-C and D-D of FIG. 6. It should be noted that in each of the figures the arrow Fr indicates the front side in the vehicle front-rear direction, the arrow Up indicates the top side in the vehicle up-down direction, and the arrow Out indicates the outside in the vehicle width direction, respectively.

As shown in FIG. 1, the air outlet structure 10 according to the first exemplary embodiment of the present invention is provided integrated with an instrument panel 82 installed in a vehicle. The main configuration of the air outlet structure 10 is provided with a case 12 serving as a flow path member, the up-down delivery direction altering mechanism 14, and the pair of fins 16 (see FIG. 2).

The case 12 is configured in a tubular shape having openings 18, 20 at end portions at each end in the vehicle front-rear direction. In the case 12 the opening 18 is at the upstream side and connected to a duct 80 of an air conditioner, and the opening 20 is at the downstream side and is open as an air outlet in an instrument panel 82 (the opening 20 is referred to as the air outlet 20 below). There is a lattice 22 provided integrated with the air outlet 20 of the case 12.

In addition a top wall 24 of the case 12 is connected to the top wall of the duct 80, as shown in FIG. 3 to FIG. 5, and is formed so as to be inclined toward the bottom in the vehicle up-down direction on progression toward the downstream side. A bottom wall 26 of the case 12 is formed with: an upstream face 26A, which is inclined toward the bottom in the vehicle up-down direction on progression toward the downstream side; an intermediate face 26B, connected to the upstream face 26A and formed horizontal so as to extend along the vehicle front-rear direction; and a downstream face 26C connected from the intermediate face 26B to the air outlet 20 and inclined toward the top in the vehicle up-down direction on progression toward the downstream side. A larger flow path cross-sectional area (cross-sectional area in the vehicle up-down direction) is provided at a middle portion 13 of the case 12 by the above described formation of the top wall 24 and bottom wall 26 than that provided at the air outlet 20.

Also at a side wall 28 of the case 12, as shown in FIG. 2, are provided: pairs of latching protrusions 30, 32 for rotatably supporting a later described operation dial 42 for up-down delivery direction altering mechanism 14 and a first gear 44, respectively; and a support portion 34 for rotatably supporting a second gear 46. The support portion 34 is provided with a ring shaped wall 36 formed in a circular shape when viewed from the side, and with a pair of integrally provided latching protrusions 38 at a top and a bottom portion of the ring shaped wall 36.

The side wall 28 is formed with cam groove 40 at the inside of the ring shaped wall 36. The cam groove 40 is formed in a curved shape positioned away from the center of the ring shaped wall 36 in the radial direction, as shown in FIG. 6. The cam groove 40 is also formed with a longitudinal direction central portion 40A, formed such that the distance from the longitudinal direction central portion 40A to the center of the ring shaped wall 36 is greater at the longitudinal direction end portion 40A than the distance from two longitudinal direction end portions 40B, 40C to the center of the ring shaped wall 36.

The up-down delivery direction altering mechanism 14 is a mechanism for changing the angle of later described pair of fins 16, and is provided with the operation dial 42, the first gear 44, the second gear 46, a rack 48 and a pair of pinions 50, as shown in FIG. 2 and FIG. 6.

The operation dial 42 is provided with a latching hole 52 that passes through a central portion thereof in the thickness direction. The operation dial 42 is rotatably supported to the case 12 by the latching protrusions 30 protruding out from the side wall 28 of the case 12 latching into the latching hole 52, as shown in FIG. 6 and FIG. 7. The operation dial 42 is configured such that in the state of being fixed to the side wall 28, as shown in FIG. 1 and FIG. 6, a portion of the operation dial 42 is exposed to the vehicle compartment interior from a hole 84 in the instrument panel 82. The operation dial 42 is also formed as a cog wheel, with gear teeth formed in the circumferential direction around the outer peripheral face thereof.

The first gear 44 has a latching hole 54 passing through a central portion thereof in the thickness direction. The first gear 44 is rotatably supported to the case 12 by the latching protrusions 32 provided to the side wall 28 latching into the latching hole 54, as shown in FIG. 6 and FIG. 7. The first gear 44 is also meshed with the above described operation dial 42.

The second gear 46 has a pair of latching holes 56 positioned at two locations distanced from the center of the second gear 46 in the radial direction, as shown in FIG. 2, and extending in a circumferential direction. The second gear 46 is rotatably supported to the case 12 by the pair of latching protrusions 38 protruding from the side wall 28 latching into the respective holes of the latching holes 56. A pair of support protrusions 58 are provided to the second gear 46 at positions from the rotational axis of the second gear 46 more to the radial direction inside than the positions of the pair of latching holes 56. The second gear 46 is meshed with the above described first gear 44.

The pair of pinions 50 have support holes 60 extending in the axial direction at central portions thereof on the second gear 46 side, as shown in FIG. 2 and FIG. 8. The pinions of the pair of pinions 50 are respectively rotatably supported by the second gear 46 by the support protrusions 58 formed to the second gear 46 being rotatably inserted into the support holes 60. The pinions 50 are accommodated on the inside of the ring shaped wall 36 of the case 12 in a supported state by the second gear 46. The pinions 50 also have angular holes 62 therein on the opposite side to that of the support holes 60.

The rack 48 is configured as a bar shaped body with rectangular cross-section, as shown in FIG. 2, and gear teeth are formed on the top face thereof. The rack 48 is retained nipped between the pair of pinions 50 and also meshes with each of the pair of pinions 50. One end portion in the longitudinal direction of the rack 48 is provided with a pin 64, extending out to the side wall 28 side of the case 12 as shown in FIG. 2 and FIG. 7. The pin 64 is moveably inserted within the above described cam groove 40.

The pair of fins 16 are disposed within the case 12, as shown in FIG. 3 to FIG. 5. Blades 66 are provided to each of the pair of fins 16, as shown in FIG. 2, extending along the vehicle width direction. Fixing protrusions 68 are also provided at portions at the ends in the vehicle width direction of this pair of fins 16, the fixing protrusions 68 have rectangular cross-section and extend outside in the vehicle width direction from the portions of the pair of fins 16. The pair of fins 16 are configured so as to move integrally with the pair of pinions 50 by the angular holes 62 provided to the pinions 50 fitting around the fixing protrusions 68, as shown in FIG. 8.

The pair of fins 16 are disposed so that the blades 66 face each other when the pinions 50 are in the above described fixed state, as shown in FIG. 3 to FIG. 5, disposed adjacent to each other such that there is a specific gap 70 between end portions 16C at the mutual rotational axis side of the pair of fins 16. The gap 70 between the end portions 16C of the pair of fins 16 is set of a dimension, as shown in FIG. 3, such that when the pair of fins 16 are moved to an up-down intermediate position thereof, sufficient air stream can be drawn in between the pair of fins 16.

Explanation will now be given of the operation of the air outlet structure 10 according to the first exemplary embodiment of the present invention.

When an air conditioning air stream blows out from a non-illustrated air conditioner into the air outlet structure 10 of the present exemplary embodiment, the air stream blows through the case 12 and out from the air outlet 20. When this occurs, if the operation dial 42 is rotationally operated to the top side (R1 side) as shown in FIG. 6, the second gear 46 is rotated to the same side (R3 side) as the operation dial 42 through the first gear 44, and the pinions 50 provided at the second gear 46 rotate to the top side (R5 side) together with the pair of fins 16, as shown in FIG. 4.

The rack 48 is retained nipped between the pair of pinions 50 as shown in FIG. 6, and so also rotates to the R3 side in the same manner as the second gear 46, however, by movement of the pin 64 to the longitudinal direction end portion 40B of the cam groove 40 as shown in FIG. 6, the pin 64 is moved toward the front side in the vehicle front-rear direction (X1 side) as shown in FIG. 4. When the rack 48 moves, the pinions 50 meshed with the rack 48 rotate to the R7 side, and each of the pair of fins 16 relatively swingably moves in the direction to approach each other (R9 side).

In the present exemplary embodiment, when the operation dial 42 as shown in FIG. 6 is rotationally operated to the top side (R1 side) to the highest position, the pair of fins 16 adopt a moved state to the topside (R5 side) as shown in FIG. 4, and the end portions 16D contact the top wall 24 of the case 12. When this occurs, each of the pair of fins 16 is relatively swinged in the direction to approach each other (R9 side) and the end portions 16D adopt a closed state. Consequently, in this state the fin 16B from the pair of fins 16, disposed at the lower side, forms an upward facing flow path 72 with the downstream face 26C of the bottom wall 26 at the downstream side of the case 12, and a high directivity air stream X is blown out upward from the air outlet 20.

Since there are no fins for altering the up-down delivery direction provided at the air outlet 20 of the case 12, sufficient actual opening area of the air outlet 20 is secured, and sufficient volume and velocity of the air stream X from the air outlet 20 is obtained.

In the above described exemplary embodiment, as shown in FIG. 6, when the operation dial 42 is rotationally operated to the bottom side (R2 side), the second gear 46 is rotated to the same side (R4 side) through the first gear 44, and the pinions 50 provided at the second gear 46 rotate to the bottom side (R6 side) shown in FIG. 4 together with the pair of fins 16.

The rack 48 is retained nipped between the pair of pinions 50 as shown in FIG. 6, and so also rotates to the R4 side in the same manner as the second gear 46. However, by movement of the pin 64 to the longitudinal direction centeral portion 40A of the cam groove 40 as shown in FIG. 6, the pin 64 is moved toward the rear side in the vehicle front-rear direction (X2 side) as shown in FIG. 3. When the rack 48 moves, the pinions 50 meshed with the rack 48 rotate to the R8 side, and the pair of fins 16 relatively swingably moves in the direction to separate from each other (R10 side).

In the present exemplary embodiment, when the operation dial 42 is rotationally operated to an up-down intermediate position as shown in FIG. 6, the pair of fins 16 adopt an up-down intermediate position as shown in FIG. 3 and are in a moved state in the direction away from each other (R10 side), with the free end side end portions 16D in an open state. Consequently, in this state the pair of fins 16 and the top wall 24 and the bottom wall 26 of the case 12 form a horizontally directed flow path 74 at the downstream side of the case 12, and a high directivity air stream Y is blown out in the horizontal direction from the air outlet 20.

Since the air stream at the downstream side of the case 12 passes through between the pair of fins 16, a high directivity spot wind Y' in the horizontal direction is blown out from the air outlet 20. Also, since there are no fins for altering the up-down delivery direction provided at the air outlet 20 of the case 12, actual opening cross-sectional area of the air outlet 20 is secured, and sufficient volume and velocity of the air conditioning air stream Y from the air outlet 20 is obtained. When this occurs, the air conditioning air stream passing through at upper and lower positions bounded by the pair of fins 16 merge together at the air outlet 20, and so an air conditioning air stream of even greater volume and velocity is blown out from the air outlet 20.

Furthermore, when in the present exemplary embodiment the operation dial 42 is further rotationally operated to the bottom side (R2 side) as shown in FIG. 6, the second gear 46 is rotated to the same side (R4 side) through the first gear 44, and the pinions 50 provided at the second gear 46 rotate to the bottom side (R6 side) together with the pair of fins 16, as shown in FIG. 5.

The rack 48 is retained nipped between the pair of pinions 50 as shown in FIG. 6, and so also rotates to the R4 side in the same manner as the second gear 46. However, by movement of the pin 64 to the longitudinal direction end portion 40C of the cam groove 40 as shown in FIG. 6, the pin 64 is moved toward the front side in the vehicle front-rear direction (X1 side) as shown in FIG. 5. When the rack 48 moves, the pinions 50 meshed with the rack 48 rotate to the R7 side, and the pair of fins 16 relatively swingably moves in the direction to approach each other (R9 side).

When in the present exemplary embodiment the operation dial 42 is rotationally operated to the bottom side (R2 side) to the lowest position, as shown in FIG. 5, the pair of fins 16 are in a moved state to the bottom side (R6 side) and the free end side end portions 16D contact the bottom wall 26 of the case 12. At this time the pair of fins 16 are also mutually moved in the direction approaching each other (R9 side) and the end portions 16D are in a closed state. Consequently, in this state a downward directed flow path 76 is formed by the pair of fins 16 and the top wall 24 of the case 12 at the downstream side of the case 12, and a high directivity air stream Z is blown out in a downward direction from the air outlet 20.

Since when this occurs there are no fins for altering the up-down delivery direction provided at the air outlet 20 of the case 12, actual opening area of the air outlet 20 is secured, and sufficient volume and velocity of the air stream Z from the air outlet 20 is obtained.

The operation of the air outlet structure 10 according to the present exemplary embodiment will now be made even clearer by comparison to a comparative example. FIG. 22 in a cross-section showing an air conditioner air outlet structure 300 according to a comparative example. In the air conditioner air outlet structure 300, plural fins 316 are provided at the air outlet 320 of the case 312 for changing the up-down delivery direction.

When there are plural fins 316 provided at the air outlet 320 of the case 312 for changing the up-down delivery direction, the actual opening area of the air outlet 320 is reduced by the fins 316, because the plural fins 316 are positioned at the air outlet 320. Also, when the fins 316 are inclined to their maximum as shown by the intermittent lines (double dotted lines)

in order to change the delivery direction of the air stream, a region A is formed by the fin 316A disposed adjacent to the side wall 326 of the case 312, and air stream dwells in the region A at the air outlet 320, thereby reducing the actual opening area of the air outlet 320. Consequently the volume and velocity of the air stream becomes insufficient due to the reduction in the actual opening area of the air outlet 320.

In order to secure the volume and velocity of the air stream it is necessary to widen the air outlet 320, however, it is difficult to form a thin structure of the air outlet 320 in the vehicle up-down direction and the left-right direction if the air outlet 320 is widened.

In comparison thereto, the air outlet structure 10 according to the present embodiment can change the delivery direction of the air stream by altering the posture of the pair of fins 16 provided at the middle portion 13 in the flow direction within the case 12, in the manner described above. Consequently the actual opening area of the air outlet 20 to the vehicle compartment can be secured since there is no necessity to provide at the air outlet 20 of the case 12 plural fins for changing the delivery direction. A thinner structure than before for the air outlet 20 to the vehicle compartment is thereby enabled. By the air outlet 20 being a thinner structure than before, this also enables, for example, the design flexibily of the instrument panel 82 to be raised.

In addition, according to the air outlet structure 10 of the present exemplary embodiment, the delivery direction of the air stream can be altered by the pair of fins 16 as described above, and since the number of fins 16 is small, the flow of the air stream in the flow path within the case 12 is not impeded, enabling the effective cross-sectional area of the flow path within the case 12 to be secured. In addition, since the actual opening area of the air outlet 20 to the vehicle compartment can be secured as described above, this enables a sufficient volume and velocity of the air conditioning air stream to be secured. However, by reducing the number of fins 16 the blade size for each fin 16 can be increased. This thus enables an air conditioning air stream also having excellent directivity to be obtained.

According to the air outlet structure 10 of the present exemplary embodiment, the flow path cross-sectional area is set greater at the flow direction middle portion 13 of the case 12 than that of the air outlet 20. Consequently the effective cross-sectional area of the flow path within the case may be even further secured. However, by disposing the pair of fins 16 at the flow direction middle portion 13 of the case 12 where the flow path cross-sectional area is larger than that of the air outlet 20, this enables the size of each blade of the fins 16 to be increased, as well as the amount of change in posture of the fins 16 to be increased. This thus enables a further increase in the directivity of the air stream.

In the air outlet structure 10 according to the present exemplary embodiment, there is no necessity to provide plural fins for changing the up-down delivery direction at the air outlet 20, as described above, enabling prevention of noise generation from the air stream interfering with fins at the air outlet 20.

In the air outlet structure 10 according to the present exemplary embodiment, as described above, the delivery direction of the air stream can be altered by cooperation of the pair of fins 16 with a simple mechanism employing plural gears, and a rack and pinions.

In the above exemplary embodiment, delivery direction of the air stream due to the air outlet structure 10 is configured to be altered upward and downward, however a configuration may be made in which the delivery direction of the air stream of the air outlet structure 10 is changed in the left-right direction.

Second Exemplary Embodiment

Explanation will now be given of the configuration of an air conditioner air outlet structure 110 according to a second exemplary embodiment of the present invention, with reference to FIG. 9 to FIG. 15.

FIG. 9 to FIG. 15 show the second exemplary embodiment of the present invention. FIG. 9 is a perspective view showing the overall configuration of the air outlet structure 110. FIG. 10 is an exploded perspective view showing a configuration of an up-down delivery direction altering mechanism 114 and a pair of fins 116. FIG. 11 to FIG. 13 are cross-sections for explaining the operation of the pair of fins 116 (cross-sections taken on line E-E of FIG. 9). FIG. 14 and FIG. 15 are explanatory diagrams of the up-down delivery direction altering mechanism 114 (cross-sections taken on line F-F of FIG. 10). It should be noted that in each of the figures the arrow Fr indicates the front side in the vehicle front-rear direction, the arrow Up indicates the top side in the vehicle up-down direction, and the arrow Out indicates the outside in the vehicle width direction, respectively.

The air outlet structure 110 according to the second exemplary embodiment of the present invention differs from the air outlet structure 10 according to the first exemplary embodiment described above in that the following changes have been made thereto. Explanation will therefore be given of the points of the second exemplary embodiment which differ from those of the first exemplary embodiment, and the same reference numerals will be used for parts of the configuration similar to those of the first exemplary embodiment, and explanation thereof omitted.

In the air outlet structure 110 according to the second exemplary embodiment of the present invention the up-down delivery direction altering mechanism 114 is a mechanism for changing the angle of the later described pair of fins 116, and is configured, as shown in FIG. 10, to include a operation dial 142, a first lever 144, and a second lever 146.

The operation dial 142 is provided with a latching hole 148 that passes through a central portion thereof in the plate thickness direction. The operation dial 142 is rotatably supported to the above described case 12 by latching protrusions 130 protruding out from the side wall 28 of the case 12 latching into the latching hole 148, as shown in FIG. 9. The operation dial 142 is configured such that in the state of being fixed to the side wall 28, as described above, a portion of a dial body 150 is exposed to the vehicle compartment interior from a hole 84 in the instrument panel 82.

In the operation dial 142 an arm connection portion 152 is also integrally formed to the dial body 150. The arm connection portion 152 is provided with a first cam groove 154 and a second cam groove 156. The first cam groove 154 is formed with an escape groove 154A extending along a circumferential direction of the dial body 150, and with a moving groove 154B extending along a radial direction of the dial body 150. In a similar manner the second cam groove 156 is formed with an escape groove 156A extending along a circumferential direction of the dial body 150, and with a moving groove 156B extending along a radial direction of the dial body 150.

The first lever 144 is provided with a pin 158 at one end in the longitudinal direction, protruding out in a direction orthogonal to the longitudinal direction, and the first lever 144 is configured with an angular hole 160 passing through in the thickness direction at the other end in the longitudinal direction thereof. The pin 158 of the first lever 144 is moveably inserted into the first cam groove 154 formed to the above described operation dial 142, as shown in FIG. 14.

The second lever 146 is provided with a pin 162 at one end in the longitudinal direction, protruding out in a direction orthogonal to the longitudinal direction, and the second lever 146 is configured with a connection bar 164 extending out in the same direction orthogonal to the longitudinal direction at the other end in the longitudinal direction. The pin 162 is moveably inserted into the second cam groove 156 formed to the above described operation dial 142, as shown in FIG. 15.

The pair of fins 116 are disposed within the case 12, as shown in FIG. 11 to FIG. 13. Each of the pair of fins 116 is configured with a blade 166 extending along the vehicle width direction. A connection potion 167 is provided to the upper fin 116A, as shown in FIG. 10, to a portion at the front end in the vehicle front-rear direction of the upper fin 116A in the vehicle width direction. Fixing protrusion 168 of rectangular cross-section is provided to the connection potion 167, extending toward the outside in the vehicle width direction, and a support hole 169 is provided to the connection potion 167 extending in the vehicle width direction. A connection potion 170 is provided to the lower fin 116B, to a portion at the front in the vehicle front-rear direction. A fixing hole 171 is provided to the connection potion 170 extending in the vehicle width direction.

The upper fin 116A is configured to swingably move with the first lever 144 due to the fixing protrusion 168 being fitted into the angular hole 160 provided to the first lever 144. The lower fin 116B is configured to swingably move with the second lever 146 due to the connection bar 164 provided to the second lever 146 being inserted, with play, into the angular hole 160 of the first lever 144 and the support hole 169 of the upper fin 116A and then fitted into the fixing hole 171. The pair of fins 116 are disposed such that, in the above described fixed state to the respective first lever 144 and second lever 146, the blades 166 face each other.

Explanation will now be given of the operation of the air outlet structure 110 according to the second exemplary embodiment of the present invention.

In the air outlet structure 110 of the present exemplary embodiment an air conditioning air stream is blown out from the air outlet of a non-illustrated air conditioner, and the air stream is blown through the case 12 and out of the air outlet 20. When this occurs, if the operation dial 142 is rotationally operated toward the bottom side (R11 side) shown in FIG. 14, the first lever 144 is rotated to the R13 side by the pin 158, moving in the moving groove 154B of the first cam groove 154 formed to the operation dial 142, and the upper fin 1 16A fixed to the first lever 144 swings upward (R15 side) as shown in FIG. 12.

It should be noted that even though the operation dial 142 is rotationally operated downward (R11 side), the pin 162 only moves in the escape groove 156A of the second cam groove 156, and the second lever 146 maintains a substantially horizontal up-down intermediate position. In addition the lower fin 116B fixed to the second lever 146 maintains an inclined state toward the top side in the vehicle up-down direction on progression toward the downstream side, like that shown in FIG. 12.

In the present embodiment, when the operation dial 142 is rotationally operated downward (R11 side) to the lowest position as shown in FIG. 14 and FIG. 15, the upper fin 116A of the pair of fins 116 is in an upward (R15 side) swinged state, and a free end side end portion 116D thereof adopts a state of contact with the top wall 24 of the case 12. The lower fin 116B is not swinged with the second lever 146, and maintains the inclined state toward the top side in the vehicle up-down direction on progression toward the downstream side. Consequently, in this state, an upward facing flow path 172 is formed at the downstream side of the case 12 between the fin 116B disposed at the lower side of the pair of fins 116 and the downstream face 26C of the bottom wall 26, and an upward facing high directivity air stream X is blown out from the air outlet 20.

When this occurs, since there are no fins for changing the up-down delivery direction provided at the air outlet 20, actual opening area of the air outlet 20 can be secured and sufficient volume and velocity of the air stream X is blown out from the air outlet 20.

From the above described state, if the operation dial 142 shown in FIG. 14 is rotationally operated upward (R12 side), the first lever 144 rotates to the R14 side due to movement of the pin 158 in the moving groove 154B of the first cam groove 154 formed in the operation dial 142, and the upper fin 116A fixed to the first lever 144 swingably moves downward (R16 side) as shown in FIG. 12.

It should be noted that even if the operation dial 142 is rotationally operated upward (R12 side) as described above, the pin 162 only moves in the escape groove 156A of the second cam groove 156, as shown in FIG. 15, and so the second lever 146 maintains a substantially horizontal up-down intermediate position. In addition the lower fin 116B fixed to the second lever 146 maintains the inclined state facing upward in the vehicle up-down direction on progression toward the downstream side, as shown in FIG. 12.

In the present exemplary embodiment, when the operation dial 142 is positioned in an up-down intermediate position, as shown in FIG. 11, the pair of fins 116 adopt an up-down intermediate positioned state, with both the end portions 116D thereof in a closed together state. Consequently a horizontal facing flow path 174 is formed at the downstream side of the case 12 by the pair of fins 116 and the top wall 24 and bottom wall 26 of the case 12, and a high directivity horizontal facing air stream Y is blown out from the air outlet 20.

When this occurs, since there are no fins for changing the up-down delivery direction provided at the air outlet 20, actual opening area of the air outlet 20 can be secured and sufficient volume and velocity of the air conditioning air stream Y is obtained. When this occurs, the air stream passing through at upper and lower positions bounded by the pair of fins 116 merge together at the air outlet 20, and so an air stream of even greater volume and velocity is obtained.

When the operation dial 142 is rotationally operated even further upward (R12 side), as shown in FIG. 15, from the above described state, the second lever 146 is rotated to the R18 side by the pin 162 moving in the moving groove 156B of the second cam groove 156, and the lower fin 116B fixed to the second lever 146 swings downward (R16 side) as shown in FIG. 13.

It should be noted that even though the operation dial 142 is rotationally operated upward (R12 side), the pin 158 only moves within the escape groove 154A of the first cam groove 154 and the first lever 144 maintains a substantially horizontal up-down intermediate position. The upper fin 116A fixed to the first lever 144 also maintains an up-down intermediate position as shown in FIG. 13.

When in the present exemplary embodiment the operation dial 142 is rotationally operated upward (R12 side) to the uppermost position, the lower fin 116B of the pair of fins 116 adopts a downward (R16 side) moved state as shown in FIG. 13, and the end portion 116D thereof adopts a state of contact with the bottom wall 26 of the case 12. The upper fin 116A does not swing with the first lever 144 and maintains an up-down intermediate position. Consequently a downward facing flow path 176 is formed at the downstream side of the case 12 by the upper fin 116A and the top wall 24, and a high directivity downward facing air stream Z is blown out from the air outlet 20.

When this occurs, since there are no fins for changing the up-down delivery direction provided at the air outlet 20, actual opening cross-sectional area of the air outlet 20 can be secured and sufficient volume and velocity of the air conditioning air stream Z is obtained.

In the air conditioner air outlet structure 110 according to the present exemplary embodiment the delivery direction of the air stream can be altered by altering the posture of the pair of fins 116 provided at the flow direction middle portion 13 within the case 12 in the manner as described above. Consequently the actual opening area of the air outlet 20 to the vehicle compartment can be secured since the air outlet 20 does not require plural fins for altering the delivery direction. A thinner structure than before for the air outlet 20 to the vehicle compartment is thereby enabled. By the air outlet 20 to the vehicle compartment being a thinner structure than before, this also enables, for example, design flexibility of the instrument panel 82 to be raised.

In addition, in the air outlet structure 110 according to the present embodiment the delivery direction of the air stream can be altered by the pair of fins 116 as described above, and since the number of fins 116 is small, the flow of the air stream in the flow path within the case 12 is not impeded, enabling the effective cross-sectional area of the flow path within the case 12 to be secured. In addition, since the actual opening area of the air outlet 20 to the vehicle compartment can be secured as described above, this enables a sufficient volume and velocity of the air stream to be secured. However, by reducing the number of fins 116 the blade size for each fin 116 can be increased. This thus enables an air stream also having excellent directivity to be obtained.

The flow path cross-sectional area is set greater at the flow direction middle portion 13 of the case 12 than that of the air outlet 20. Consequently the effective cross-sectional area of the flow path within the case may be even further secured. However, by disposing the pair of fins 116 at the flow direction middle portion 13 of the case 12 where the flow path cross-sectional area is larger than that of the air outlet 20, this enables the blade size of each of the fins 116 to be increased, as well as the amount of change in posture of the fins 16 to be increased. This thus enables a further increase in the directivity of the air conditioning air stream.

There is no necessity to provide plural fins for changing the up-down delivery direction at the air outlet 20, as described above, this therefore enables prevention of the noise generation by the air stream interfering with fins at the air outlet 20.

There is also a pair of levers in the air outlet structure 110 according to the present embodiment, and delivery direction of the air stream can be altered by cooperation of the pair of levers and the pair of fins 116, with a simple mechanism using pins and grooves for rotating the pair of levers.

In the above described embodiment the delivery direction of the air stream is configured to be altered up and down by the air outlet structure 110, however configuration may be made in which the delivery direction of the air stream is altered left-right by the air outlet structure 110.

Third Exemplary Embodiment

Explanation will now be given of an air conditioner air outlet structure 210 of a third exemplary embodiment of the present invention, with reference to FIG. 16 to FIG. 21.

FIG. 16 to FIG. 21 show the third exemplary embodiment. FIG. 16 is a perspective view showing the overall configuration of the air outlet structure 210. FIG. 17 is an exploded perspective view showing the configuration of an up-down delivery direction altering mechanism 214 and a pair of fins 216. FIG. 18 to FIG. 20 are cross-sectional diagrams for explaining the operation of the pair of fins 216 (cross-sections taken on line G-G of FIG. 16). FIG. 21 is a cross-sectional diagram taken on line H-H of FIG. 16. It should be noted that in each figure the arrow Fr indicates the front side in the vehicle front-rear direction, the arrow Up indicates the top side in the vehicle up-down direction, and the arrow Out indicates the outside in the vehicle width direction, respectively.

The air outlet structure 210 according to the third exemplary embodiment of the present invention differs from the air outlet structure 10 according to the first exemplary embodiment described above in that the following changes have been made thereto. Explanation will therefore be given of the points of the third exemplary embodiment which differ from those of the first exemplary embodiment, and the same reference numerals will be used for parts of the configuration similar to those of the first exemplary embodiment, and explanation thereof omitted.

In the air conditioner air outlet structure 210 according to the third exemplary embodiment of the present invention the up-down delivery direction altering mechanism 214 is for changing the angle of the pair of fins 216 as described later, and is configured to include, as shown in FIG. 17, an operation dial 242, a first gear 243, a second gear 244, and a third gear 245.

The operation dial 242 is configured to include a latching hole 246 passing through the central portion thereof in the plate thickness direction. The operation dial 242, as shown in FIG. 16 and FIG. 17, is rotatably supported to the case 12 by latching protrusions 230 protruding out from the side wall 28 of the case 12 latching into the latching hole 246. The operation dial 242 is configured such that in the state of being fixed to the side wall 28, a portion of the operation dial 242 is exposed to the vehicle compartment interior from a hole 84 in the instrument panel 82. The operation dial 242 is configured with gear teeth formed in a circumferential direction around the outer peripheral face thereof.

The first gear 243 is configured with a latching hole 247 passing through the central portion thereof in the plate thickness direction. The first gear 243, as shown in FIG. 16 and FIG. 17, is rotatably supported to the case 12 by latching protrusions 232 protruding out from the side wall 28 latching into the latching hole 247. The first gear 243 is meshed with the operation dial 242.

The second gear 244 and the third gear 245 are each configured with respective fitting holes 248, 250 passing through central portions thereof in the plate thickness direction, as shown in FIG. 17. The pair of fins 216 are configured with pins 268, 270 at end portions 216C at the swinging axis side of the pair of fins 216, facing outside in the vehicle width direction. These pins 268, 270 are fitted into respective fitting holes 248, 250 in the second gear 244 and the third gear 245 after insertion, with play, through support holes 234, 236 formed in the side wall 28 of the case 12.

The pair of fins 216 is thereby fixed to the second gear 244 and the third gear 245, while being swingably supported with respect to the case 12. Each of the pair of fins 216 is disposed such that when each is in the above described fixed state to the case 12, blades 266 are mutually aligned in the flow direction of the air stream at the upstream side and the downstream side.

The second gear 244, which is fixed to the fin 216A of the pair of fins 216 disposed at the downstream side, is meshed with the first gear 243, and the third gear 245 that is fixed to the fin 216B of the pair of fins 216 disposed at the upstream side, is meshed with the second gear 244.

Explanation will now be given of the operation of the air conditioner air outlet structure 210 according to the third exemplary embodiment of the present invention.

In the air outlet structure 210 of the present embodiment, when the air stream is blown out from the air outlet of a non illustrated air conditioner, the air stream is blown through the case 12 and out from the air outlet 20. As this occurs, if the operation dial 242 is rotationally operated upward (R21 side) like as shown in FIG. 21, the second gear 244 is rotated, via the first gear 243, to the same side (R23 side) as the operation dial 242, and the third gear 245 is rotated via the second gear 244 to the opposite side (R25 side) to that of the second gear 244. The pair of fins 216 provided to the second gear 244 and the third gear 245 is thereby swinged upward (R27 side) as shown in FIG. 18.

In the present embodiment, when the operation dial 242 is rotationally operated upward (R21 side) to the highest position, as shown in FIG. 19, the pair of fins 216 adopt an upward (R27 side) moved state, and free end side end portions 216D thereof contact with the top wall 24 of the case 12. Consequently, in this state, an upward facing flow path 272 is formed at the downstream side of the case 12 by the pair of fins 216 and the bottom wall 26, and an upward facing high directivity air stream X is blown out from the air outlet 20.

When this occurs, the actual opening area of the air outlet 20 is secured since there are no fins for changing the delivery direction provided at the air outlet 20 and the air conditioning air stream X blows out from the air outlet 20 with sufficient volume and velocity.

However, in the above described embodiment, as shown in FIG. 21, when the operation dial 242 is rotationally operated downward (R22 side), the second gear 244 rotates via the first gear 243 to the same side (R24 side) as the operation dial 242, and the third gear 245 rotates via the second gear 244 toward the opposite side to that of the second gear 244 (R26 side). The pair of fins 216 provided to the second gear 244 and the third gear 245 is thereby swinged downward, (R28 side) shown in FIG. 19.

In the present embodiment, when the operation dial 242 is disposed in an up-down intermediate position, as shown in FIG. 18, the pair of fins 216 are positioned in an up-down intermediate position, and the end portions 216D thereof are positioned between the top wall 24 and the bottom wall 26 of the case 12. Consequently a horizontal facing flow path 274 is formed in this state at the downstream side of the case 12 by the pair of fins 216 and the top wall 24 and the bottom wall 26 of the case 12, and a horizontal facing high directivity air stream Y blows out from the air outlet 20.

When this occurs the actual opening cross-sectional area of the air outlet 20 is secured since there are no fins for changing the delivery direction provided at the air outlet 20 and the air stream Y blows out from the air outlet 20 with sufficient volume and velocity. When this occurs, the air stream passing through at upper and lower positions bounded by the pair of fins 216 merge together at the air outlet 20, and so an air stream of even greater volume and velocity is blown out from the air outlet 20.

From the above described state, when the operation dial 242 is rotationally operated downward (R22 side) as shown in FIG. 21, the second gear 244 is rotated via the first gear 243 to the same side (R24 side) as that of the operation dial 242, and the third gear 245 is rotated via the second gear 244 to the opposite side (R26 side) to that of the second gear 244. The pair of fins 216 provided to the second gear 244 and the third gear 245 is thereby swinged downward (R28 side) as shown in FIG. 20.

In the present embodiment when the operation dial 242 is rotationally operated downward (R22 side) to the lowest position, as shown in FIG. 20, the pair of fins 216 adopts a downward (R28 side) moved state, a substantially horizontal state, with the end portions 216D thereof contact with an upstream side end portion 26D of the bottom wall 26 and with a downstream side portion 26E of the case 12, respectively. Consequently a downward facing flow path 276 is formed at the downstream side of the case 12 by the pair of fins 216 and the top wall 24, and a downward facing high directivity air stream Z is blown out from the air outlet 20.

When this occurs the actual opening area of the air outlet 20 is secured since there are no fins for changing the delivery direction provided at the air outlet 20 of the case 12 and the air stream Z blows out from the air outlet 20 with sufficient volume and velocity.

According to the air outlet structure 210 of the present embodiment, the delivery direction of the air stream can be altered by altering the posture of the pair of fins 216 provided at the flow direction middle portion 13 within the case 12 in this manner. Consequently the actual opening area of the air outlet 20 to the vehicle compartment can be secured since the air outlet 20 of the case 12 does not require plural fins for altering the delivery direction. A thinner structure than before for the air outlet 20 to the vehicle compartment is thereby enabled. By the air outlet 20 being a thinner structure than before, this also enables, for example, design flexibility of the instrument panel 82 to be raised.

According to the air outlet structure 210 of the present embodiment, the delivery direction of the air conditioning air stream can be altered by the pair of fins 216 as described above, and since the number of fins 216 is small, the flow of the air stream in the flow path within the case 12 is not impeded, enabling the effective cross-sectional area of the flow path within the case 12 to be secured. In addition, since the actual opening area of the air outlet 20 to the vehicle compartment can be secured as described above, this enables a sufficient volume and velocity of the air conditioning air stream to be secured. However, by reducing the number of fins 216 the blade size for each fin 216 can be increased. This thus enables an air stream also having excellent directivity to be obtained.

According to the air outlet structure 210 of the present embodiment, the flow path cross-sectional area is set greater at the flow direction middle portion 13 of the case 12 than that of the air outlet 20. Consequently the effective cross-sectional area of the flow path within the case may be even further secured. However, by disposing the pair of fins 216 at the flow direction middle portion 13 of the case 12 where the flow path cross-sectional area is larger than that of the air outlet 20, this enables the blade size of each of the fins 216 to be increased, as well as the amount of change in posture of the fins 26 to be increased. This thus enables a further increase in the directivity of the air stream.

In the air outlet structure 210 of the present embodiment, plural fins are not necessary for changing the up-down delivery direction at the air outlet 20, as described above, enabling prevention of noise generation by the air stream interfering with fins at the air outlet.

The air outlet structure 210 of the present embodiment also can change the delivery direction of the air conditioning air stream by cooperation of the pair of fins 216 using a simple mechanism of plural gears, like that described above.

In the above described embodiment the delivery direction of the air stream is configured to be altered up and down by the air outlet structure 210, however configuration may be made in which the delivery direction of the air stream is altered left-right by the air outlet structure 210.

Figure 1:
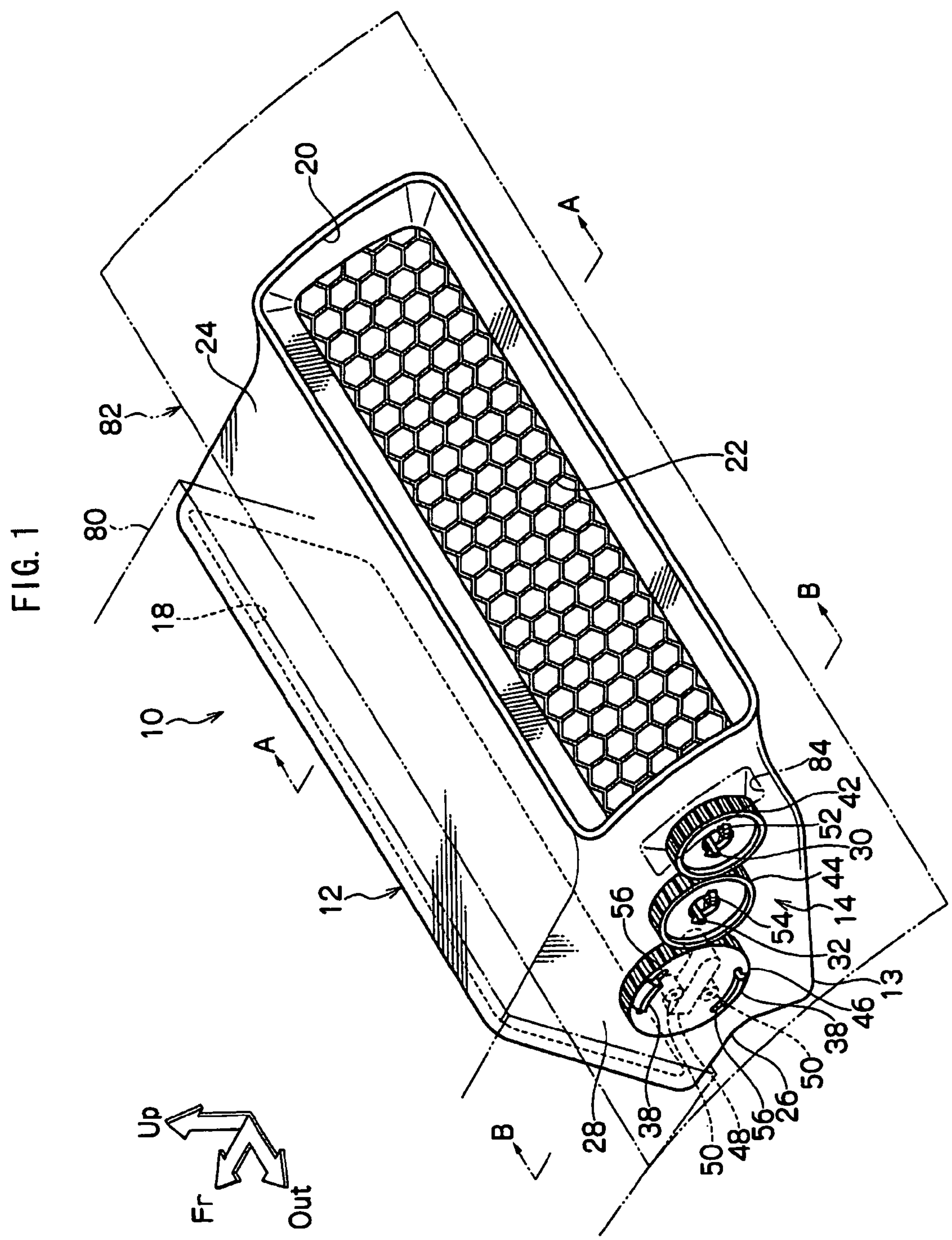
FIG. 1 is a perspective view showing the overall configuration of an air conditioner air outlet structure according to a first exemplary embodiment of the present invention.
Figure 2:
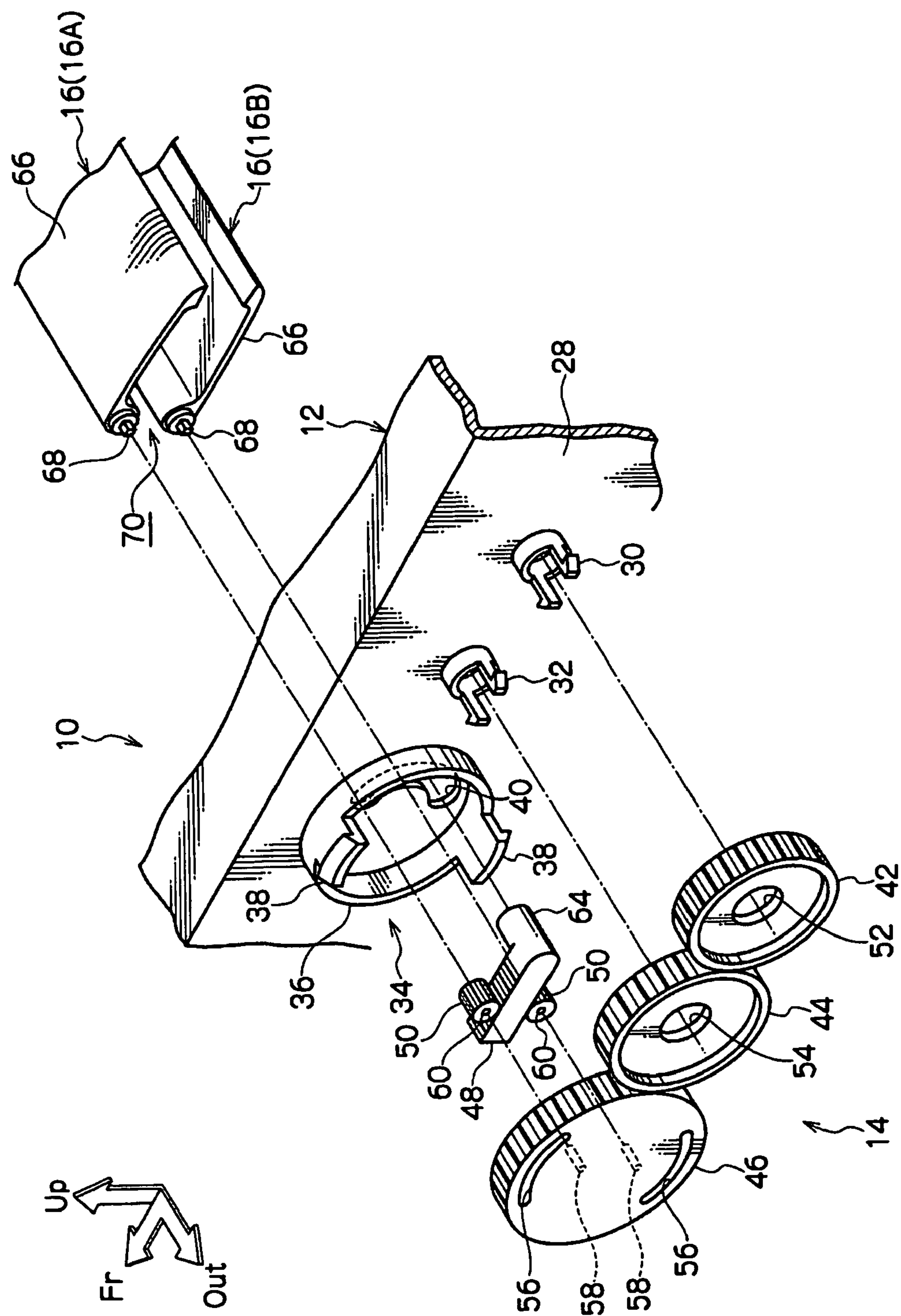
FIG. 2 is an exploded perspective view showing a configuration of an up-down delivery direction altering mechanism and a pair of fins according to the first exemplary embodiment of the present invention.
Figure 3:
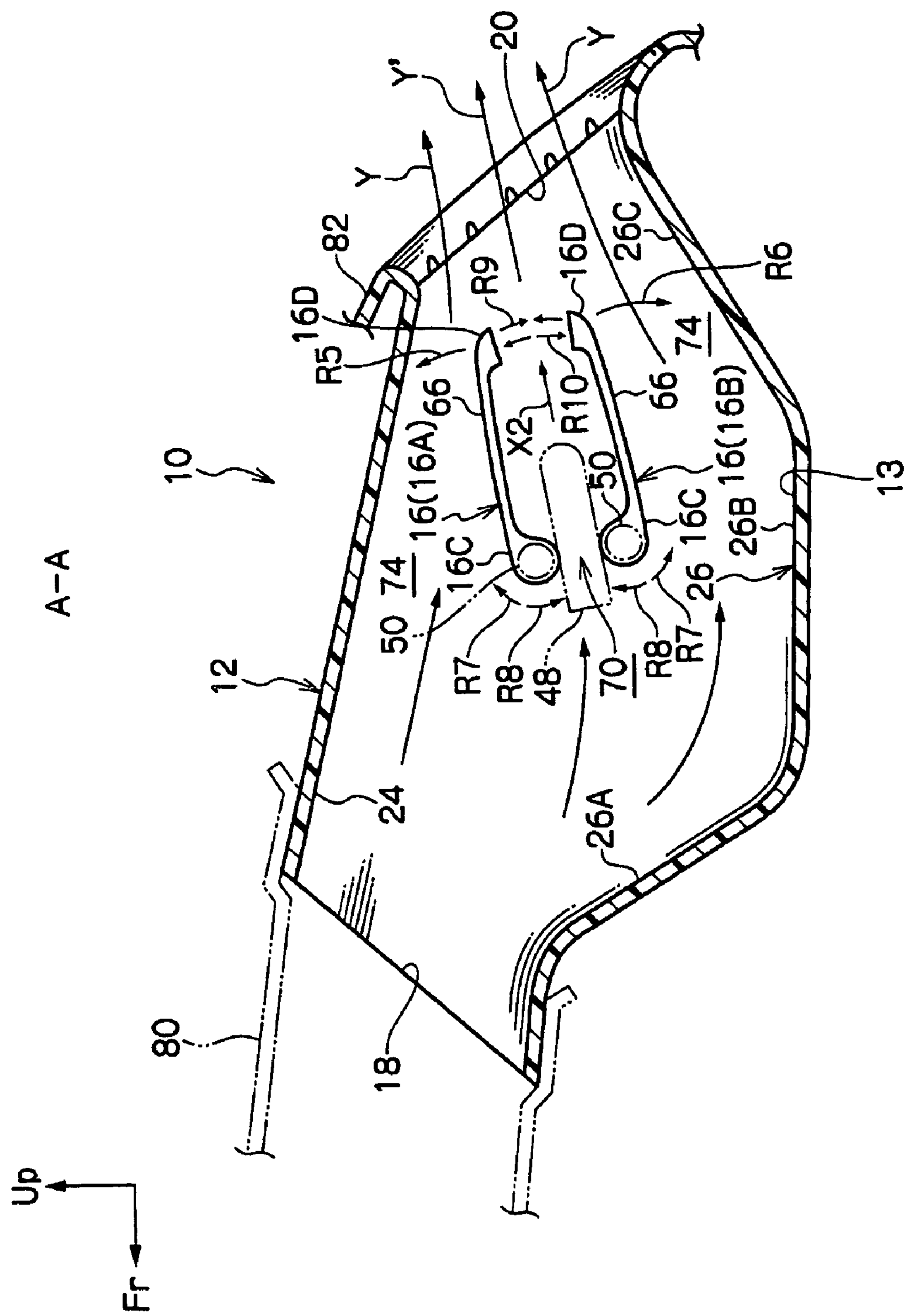
FIG. 3 is a cross-section for explaining the operation of the pair of fins according to the first exemplary embodiment of the present invention (a cross-section taken on line A-A of FIG. 1).
Figure 4:
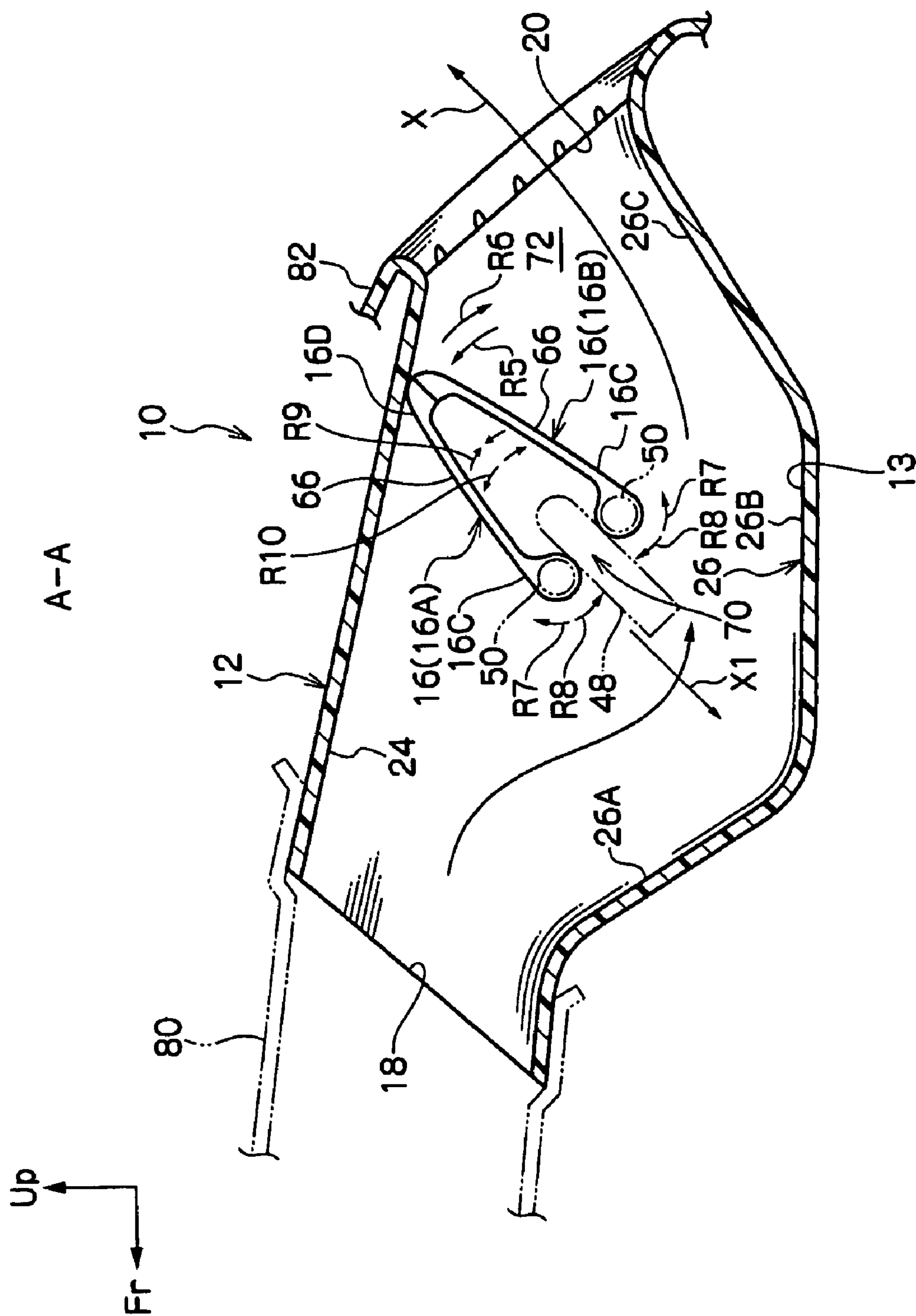
FIG. 4 is a cross-section for explaining the operation of the pair of fins according to the first exemplary embodiment of the present invention (a cross-section taken on line A-A of FIG. 1).
Figure 5:
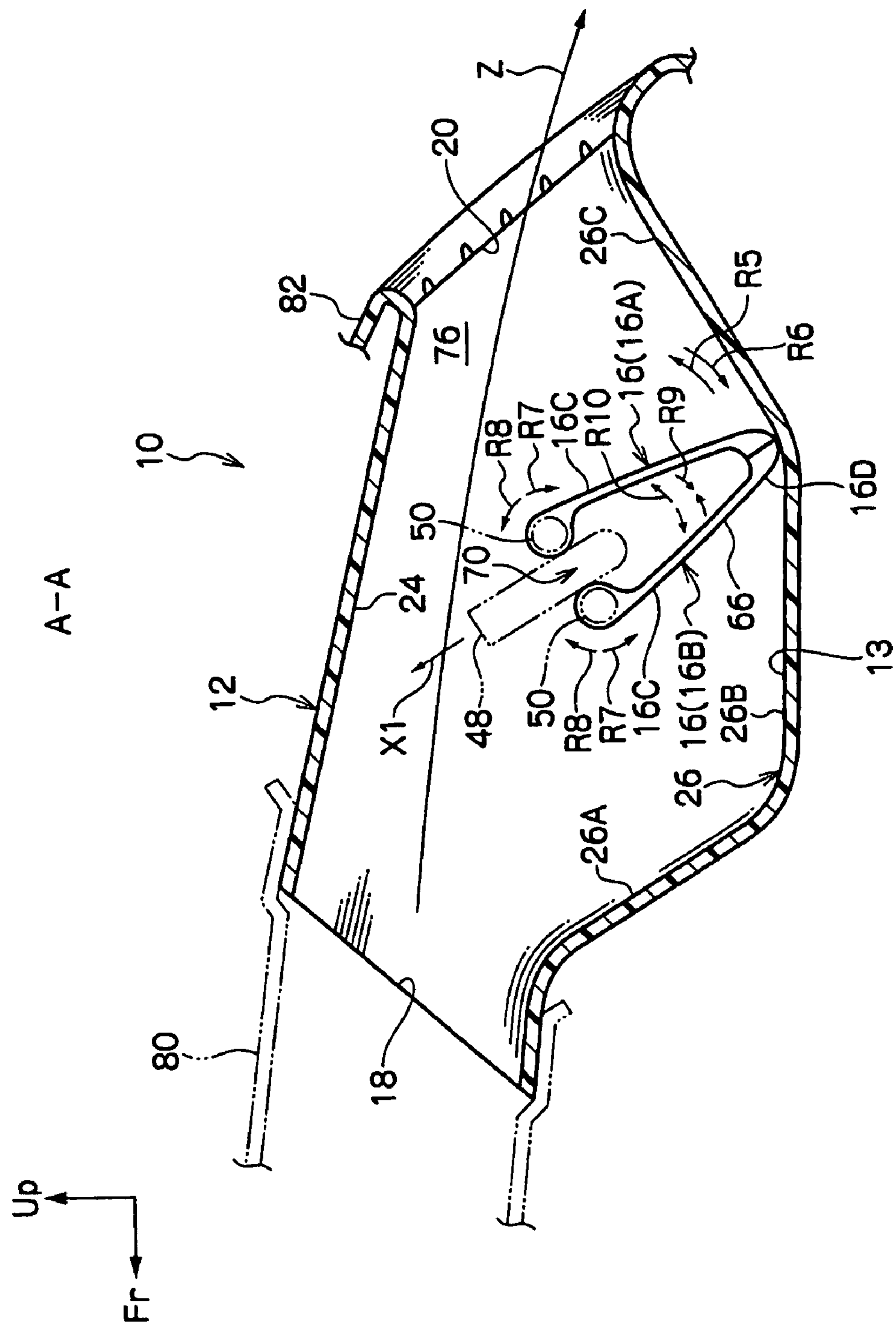
FIG. 5 is a cross-section for explaining the operation of the pair of fins according to the first exemplary embodiment of the present invention (a cross-section taken on line A-A of FIG. 1).
Figure 6:
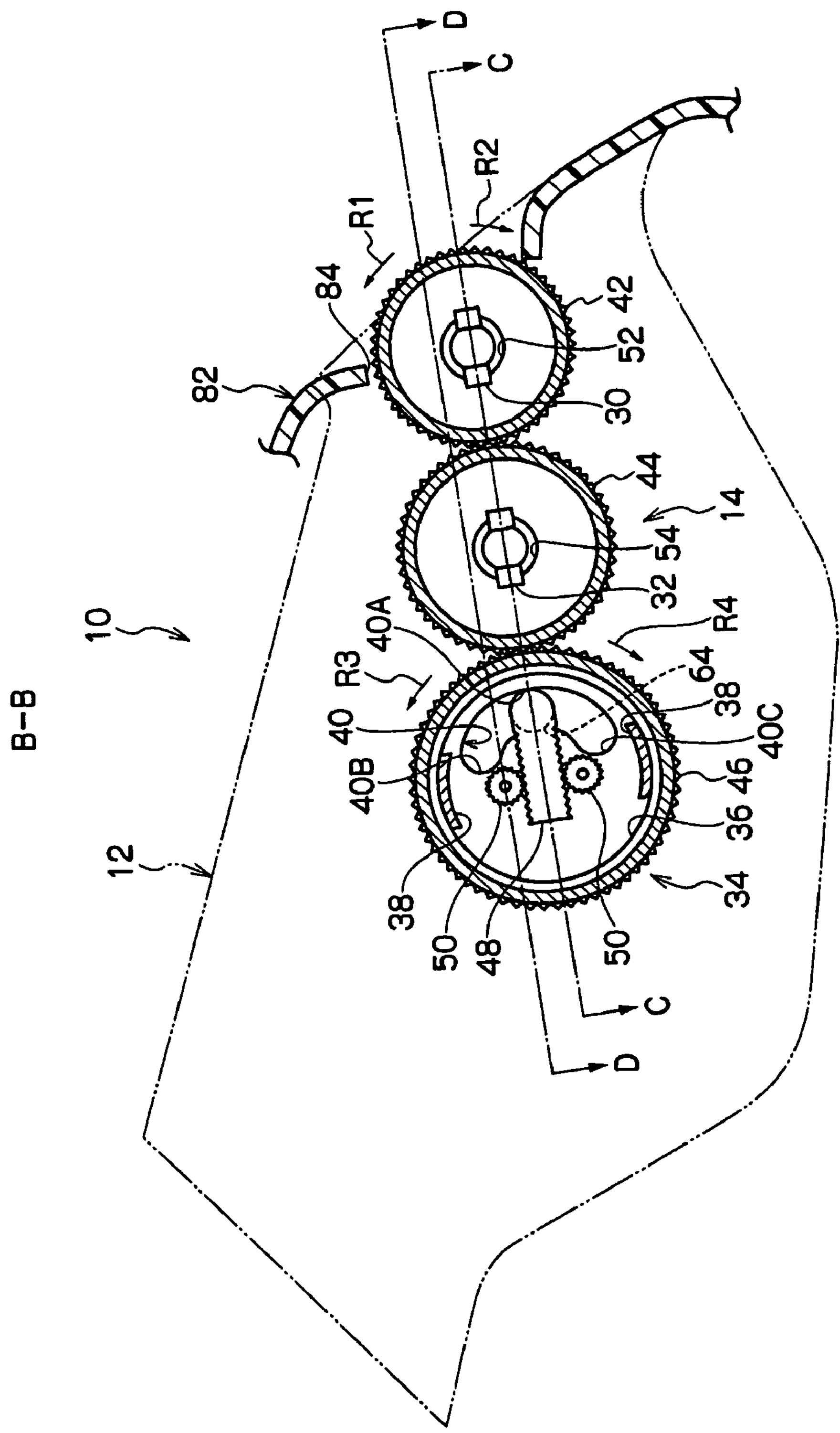
FIG. 6 is a cross-section on line B-B of FIG. 1.
Figure 7:
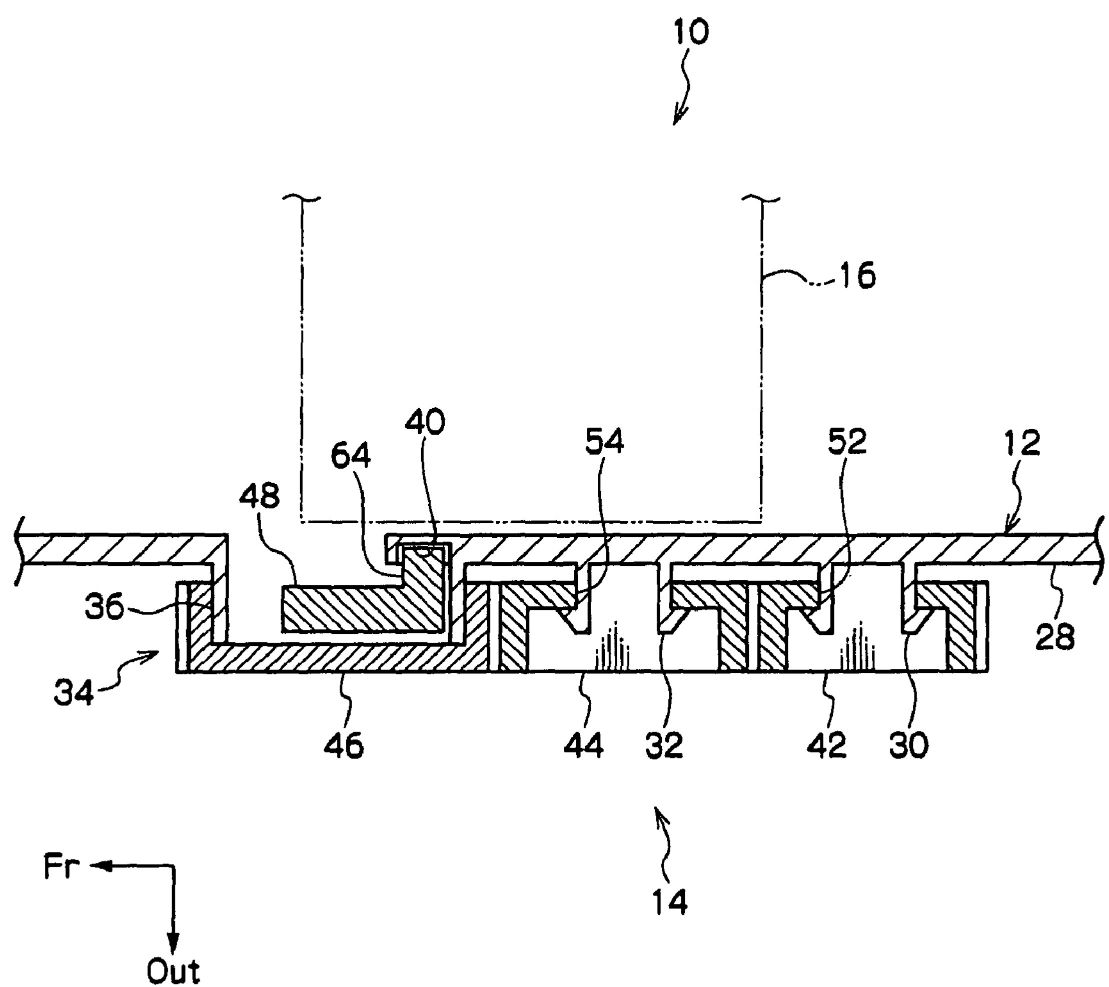
FIG. 7 is a cross-section of the air conditioner air outlet structure according to the first exemplary embodiment of the present invention sectioned on line C-C of FIG. 6.
Figure 8:
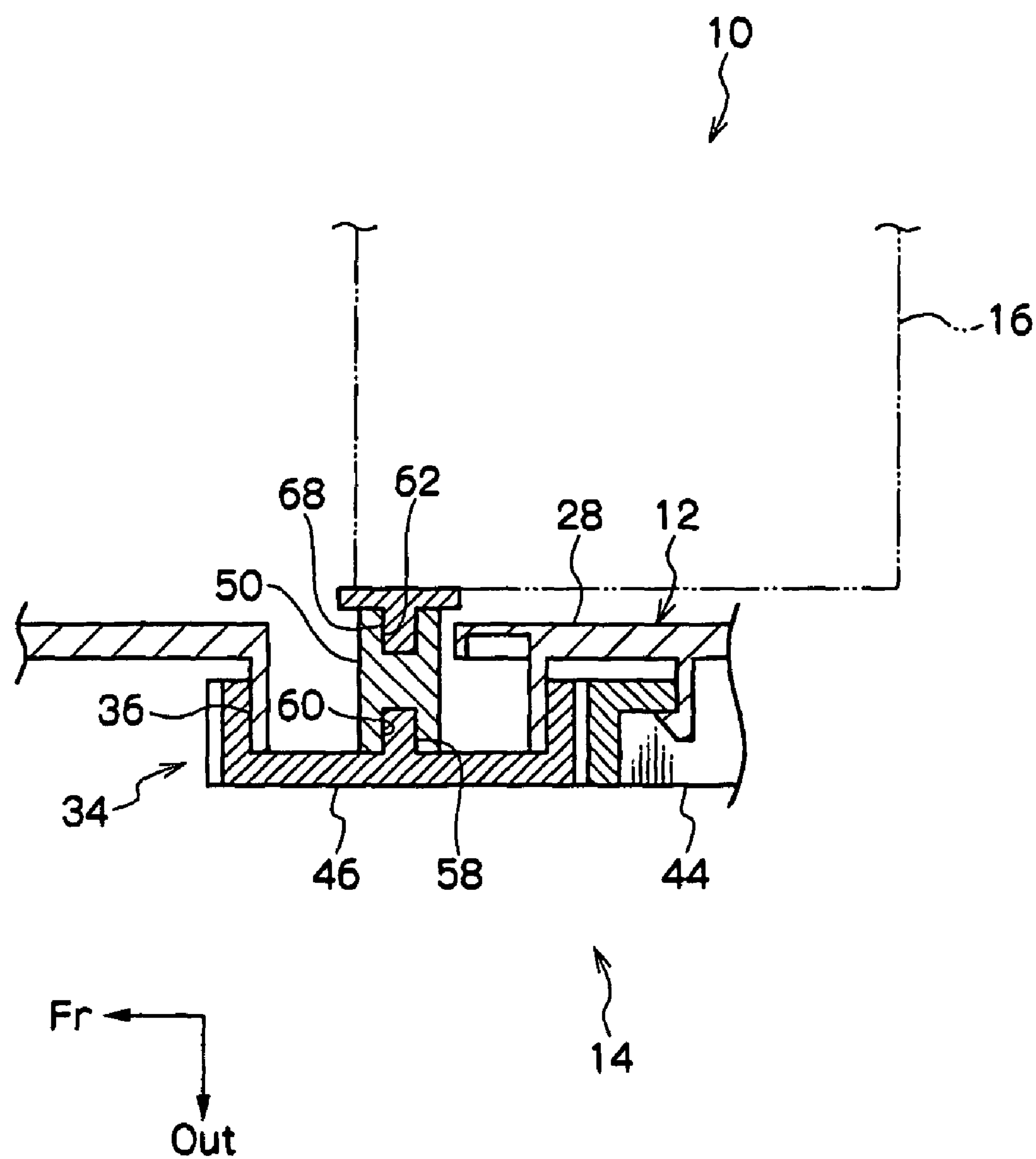
FIG. 8 is a cross-section of the air conditioner air outlet structure according to the first exemplary embodiment of the present invention sectioned on line D-D of FIG. 6.
Figure 9:
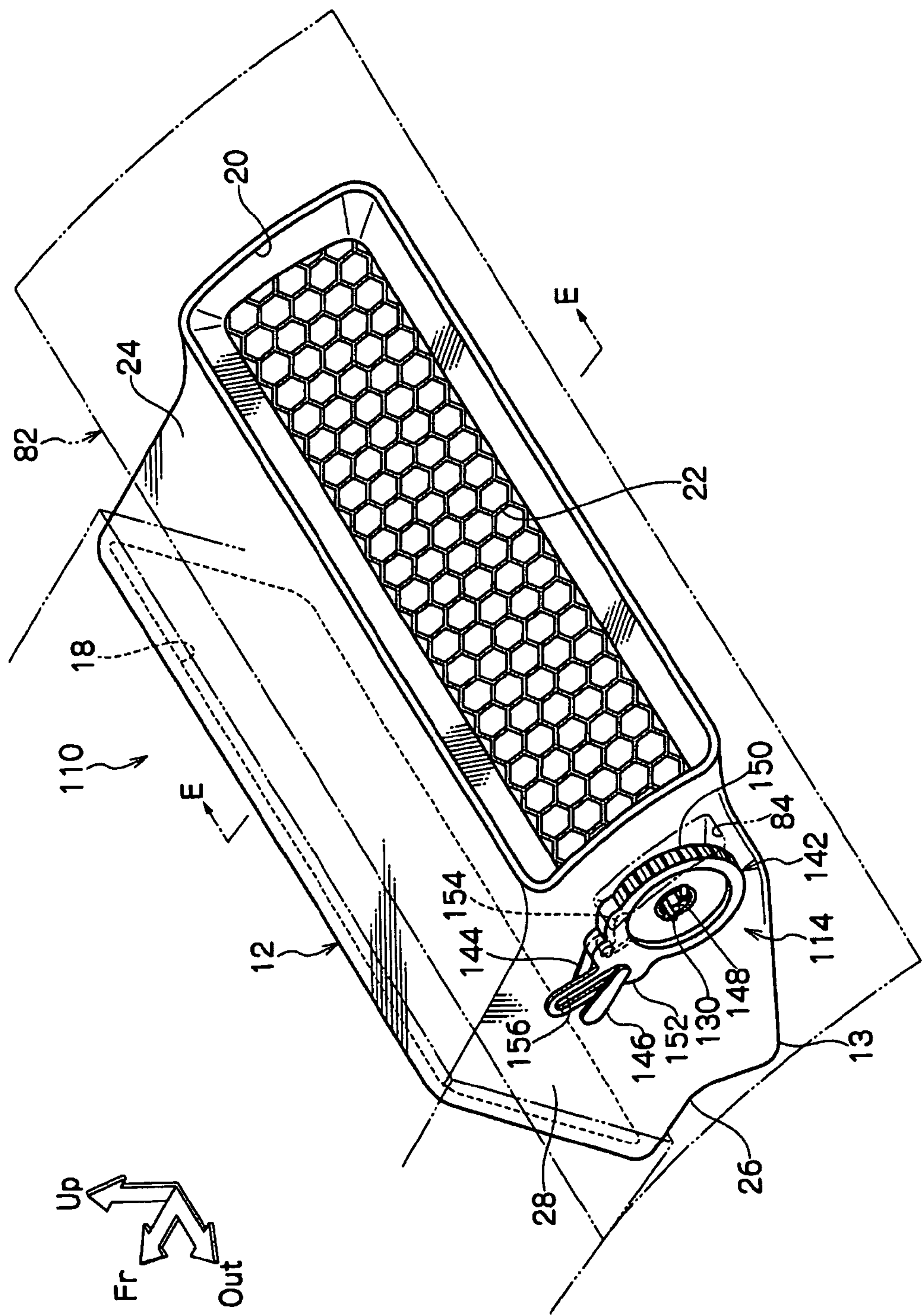
FIG. 9 is a perspective view showing the overall configuration of an air conditioner air outlet structure according to a second exemplary embodiment of the present invention.
Figure 10:
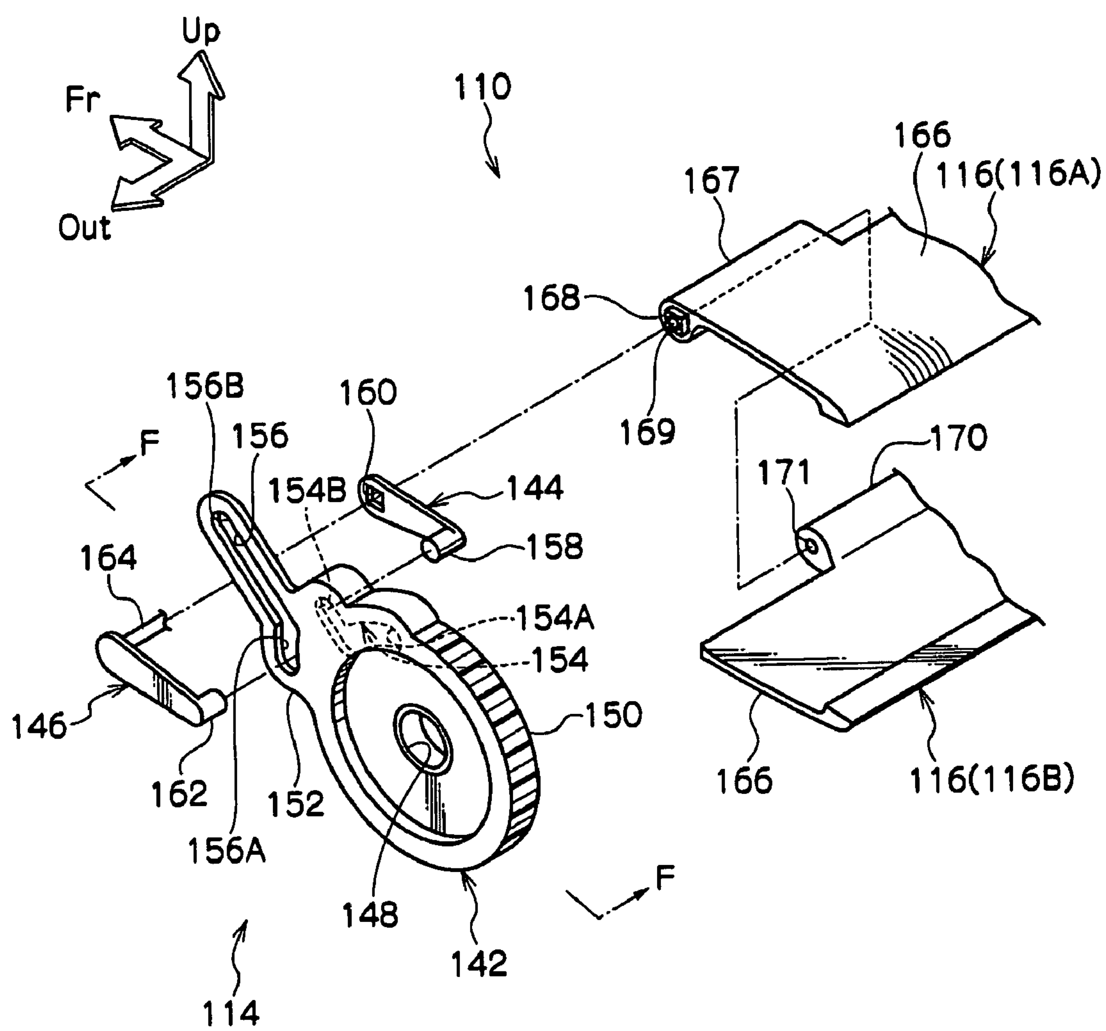
FIG. 10 is an exploded perspective view showing a configuration of an up-down delivery direction altering mechanism and a pair of fins according to the second exemplary embodiment of the present invention.
Figure 11:
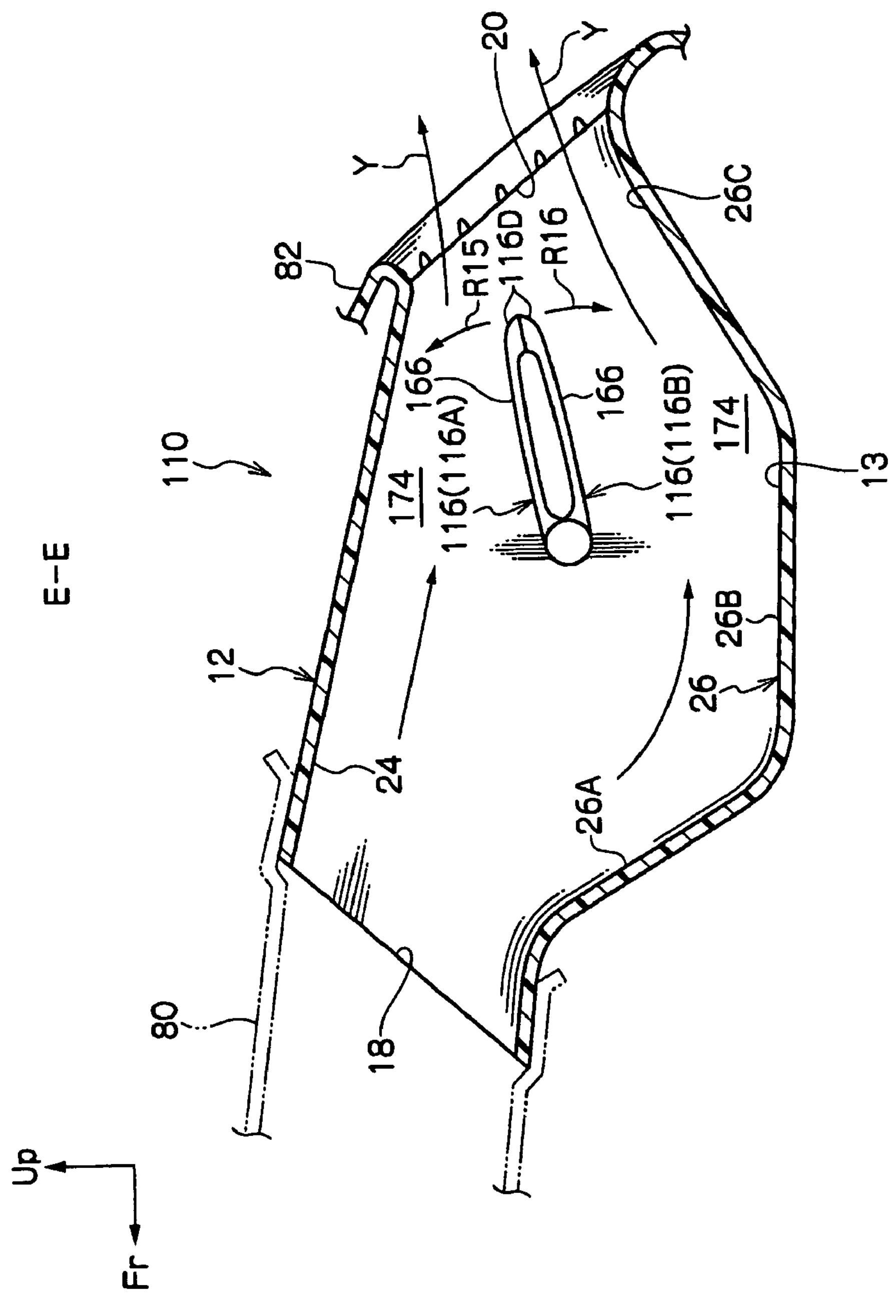
FIG. 11 is a cross-section for explaining the operation of the pair of fins according to the second exemplary embodiment of the present invention (a cross-section taken on line E-E of FIG. 9).
Figure 12:
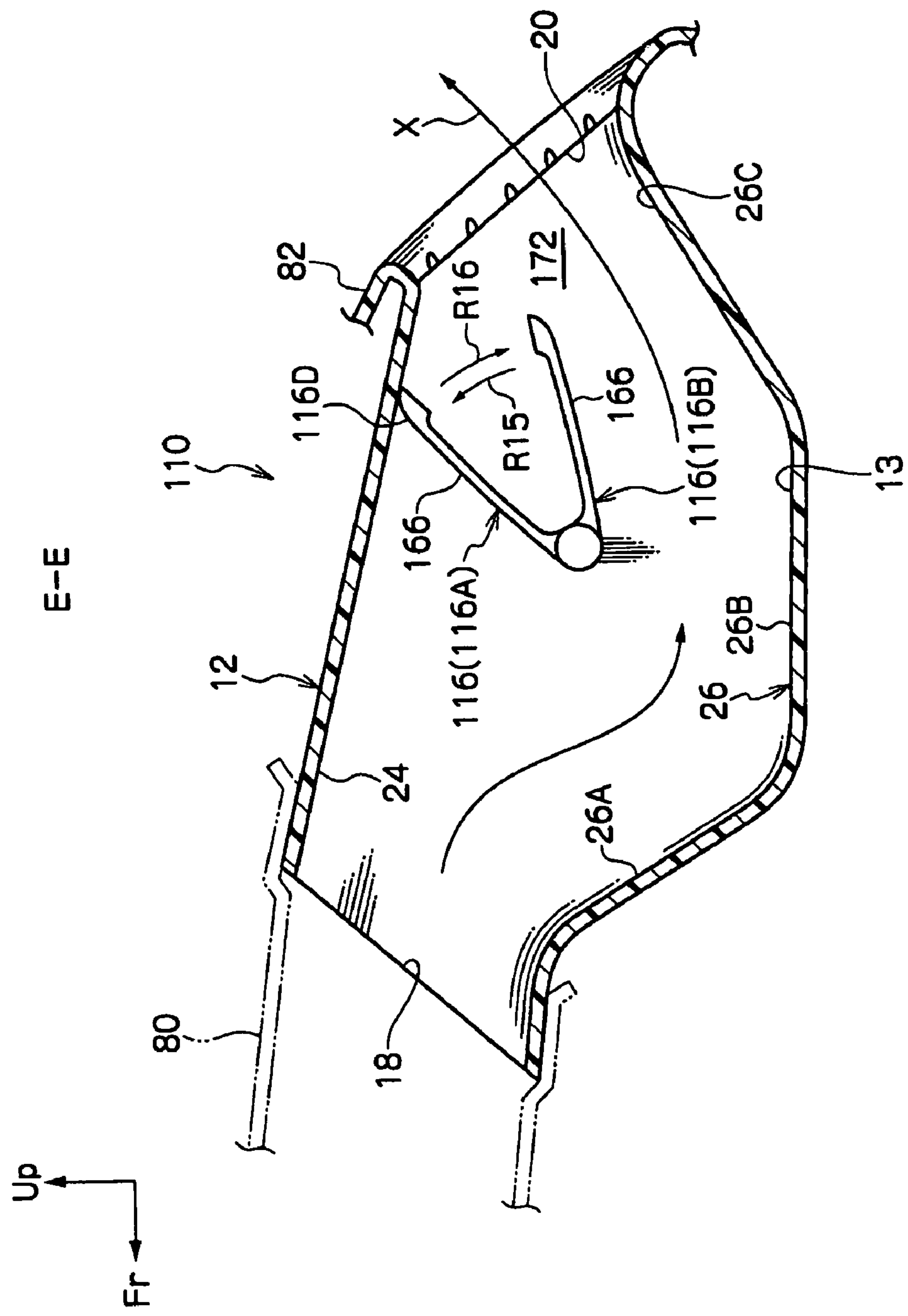
FIG. 12 is a cross-section for explaining the operation of the pair of fins according to the second exemplary embodiment of the present invention (a cross-section taken on line E-E of FIG. 9).
Figure 13:
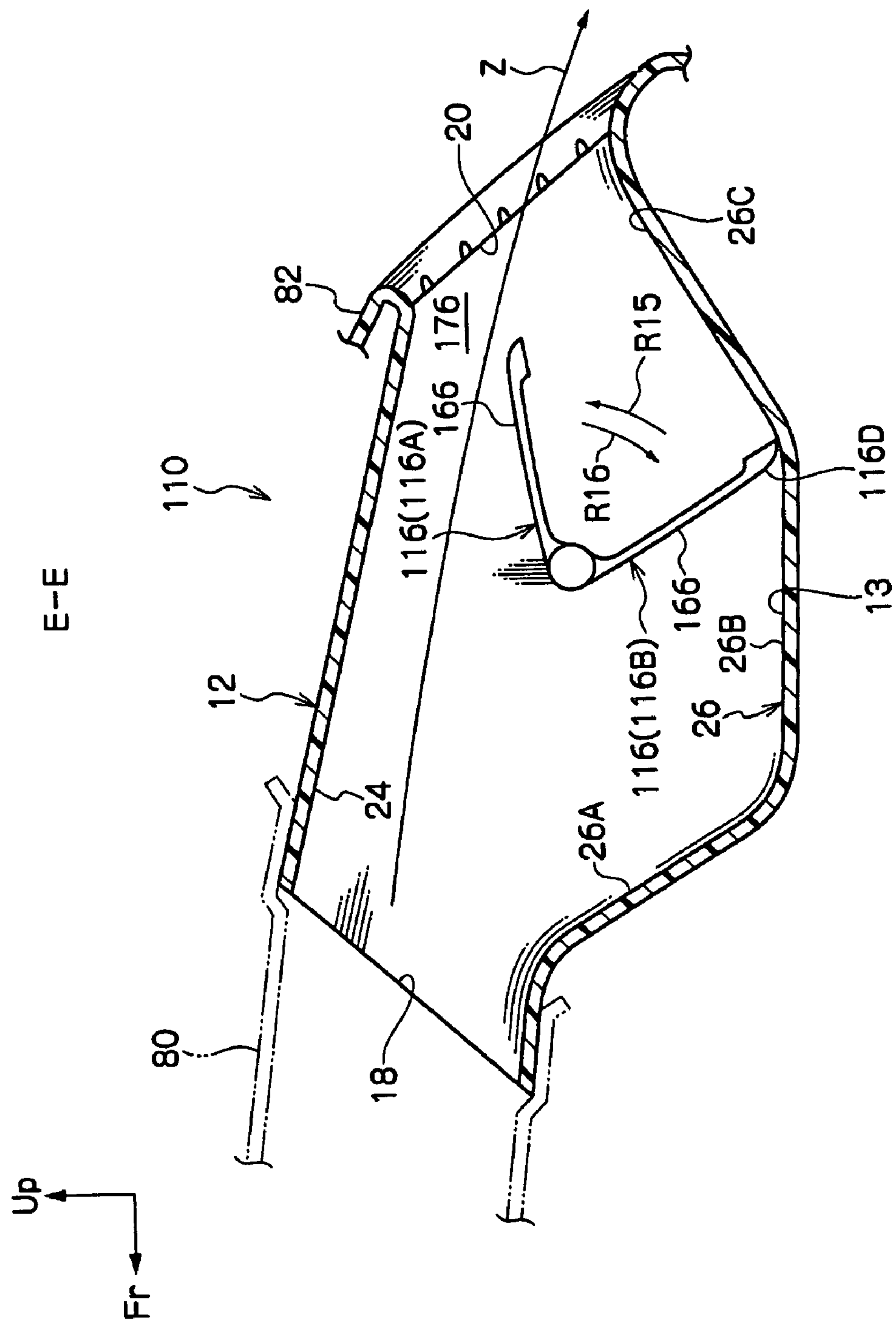
FIG. 13 is a cross-section for explaining the operation of the pair of fins according to the second exemplary embodiment of the present invention (a cross-section taken on line E-E of FIG. 9).
Figure 14:
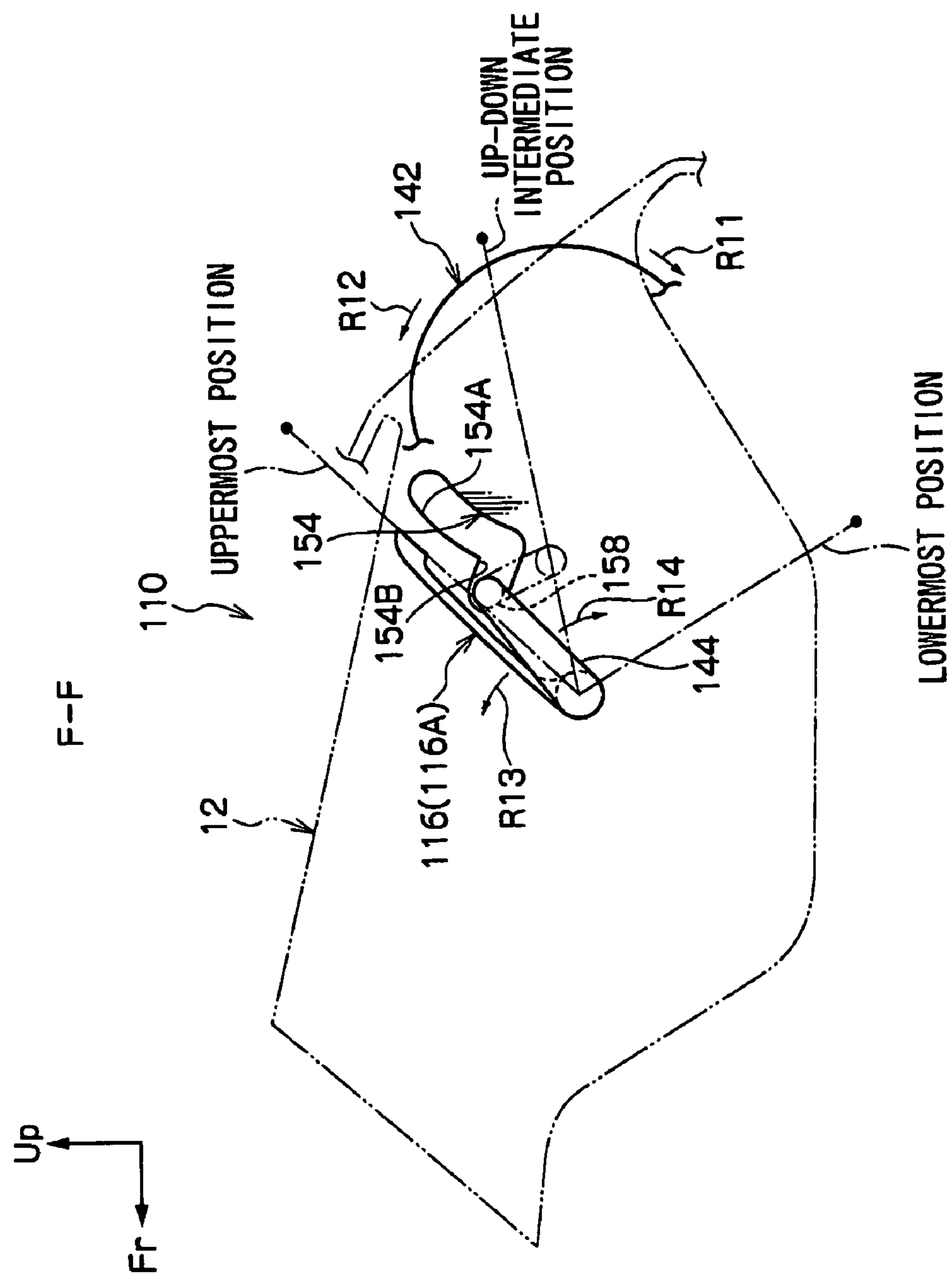
FIG. 14 is a cross-section for explaining the operation of the up-down delivery direction altering mechanism according to the second exemplary embodiment of the present invention (a cross-section taken on line F-F of FIG. 10).
Figure 15:
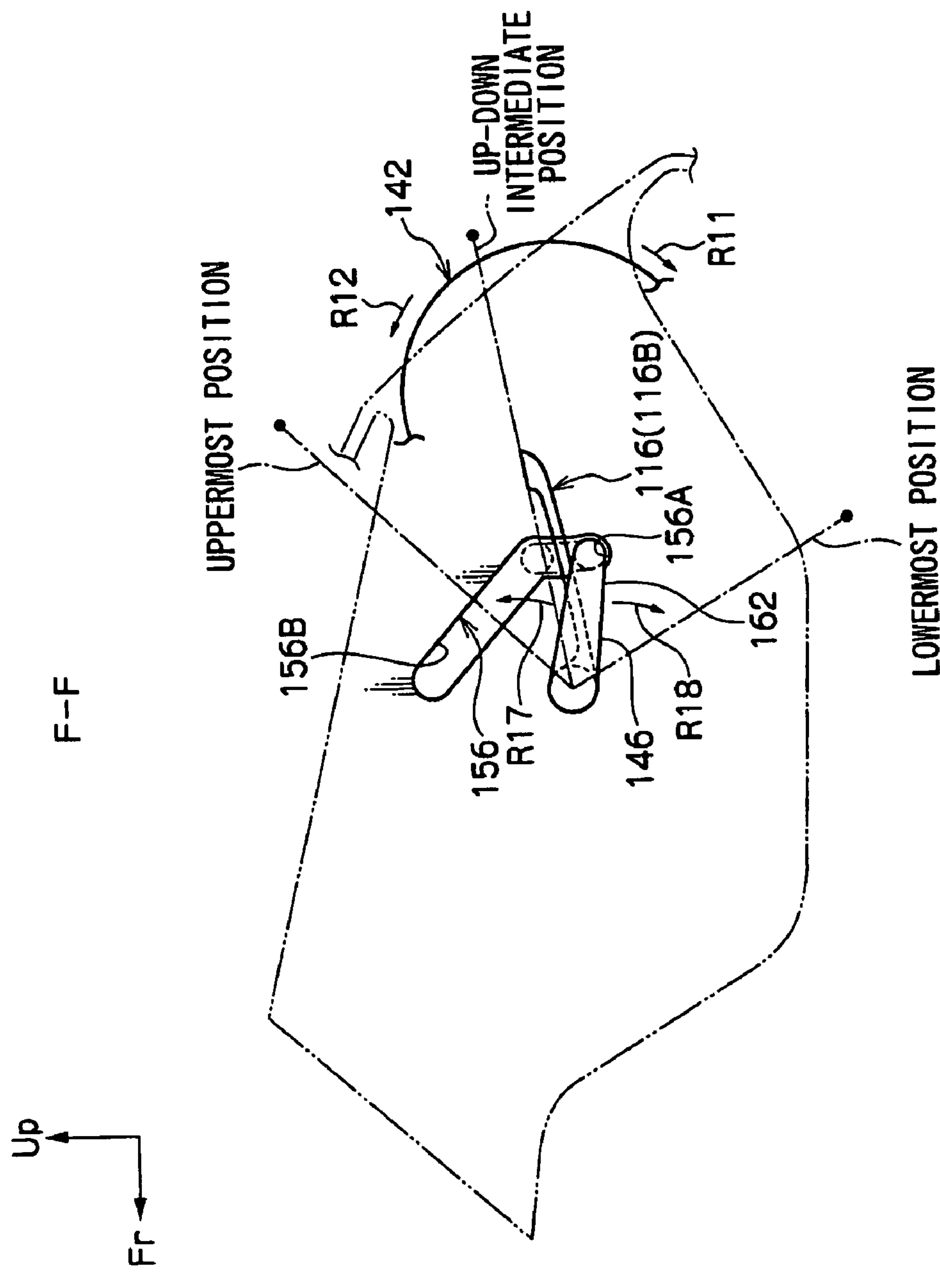
FIG. 15 is a cross-section for explaining the operation of the up-down delivery direction altering mechanism according to the second exemplary embodiment of the present invention (a cross-section taken on line F-F of FIG. 10).
Figure 16:
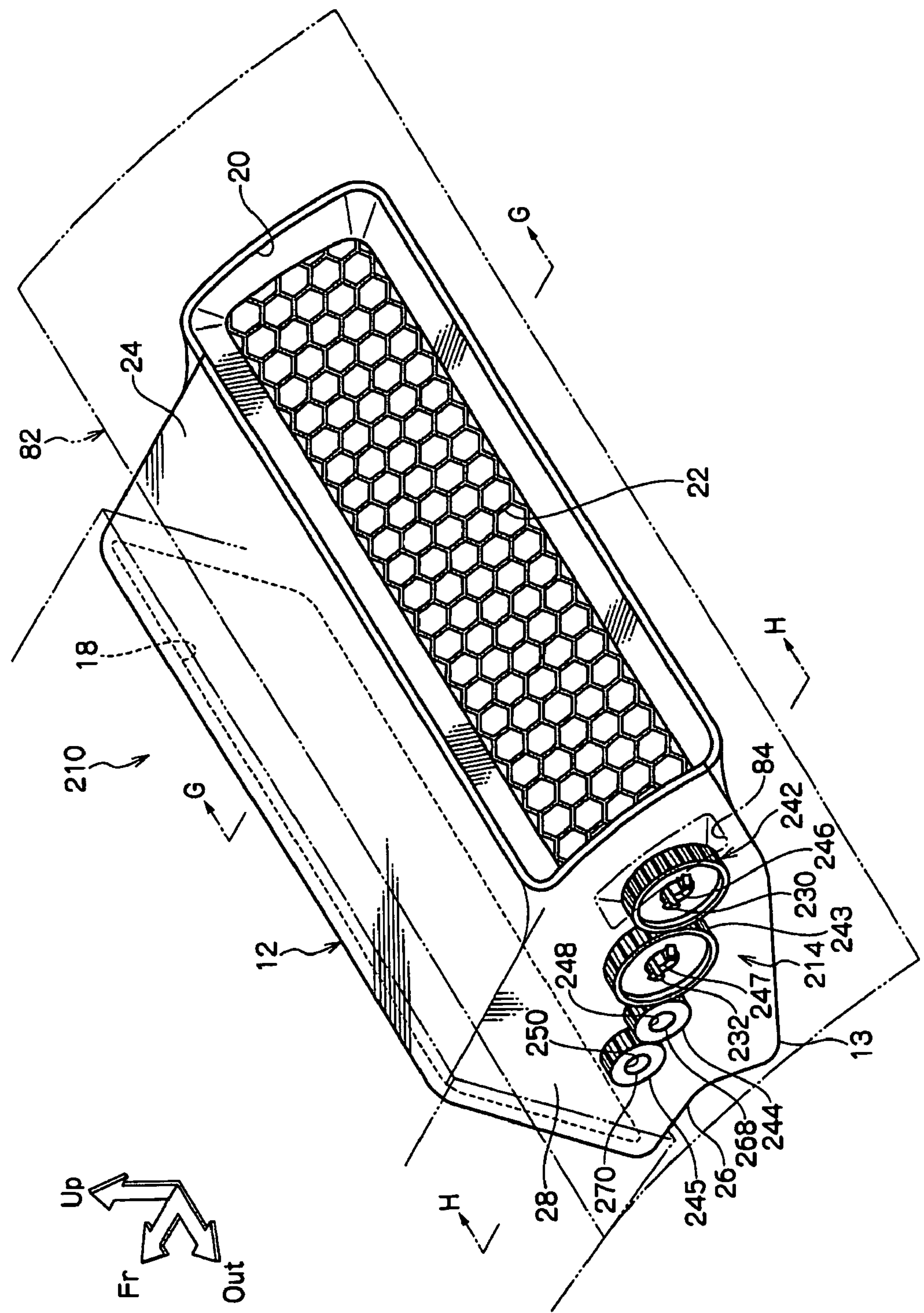
FIG. 16 is a perspective view showing the overall configuration of an air conditioner air outlet structure according to a third exemplary embodiment of the present invention.
Figure 17:
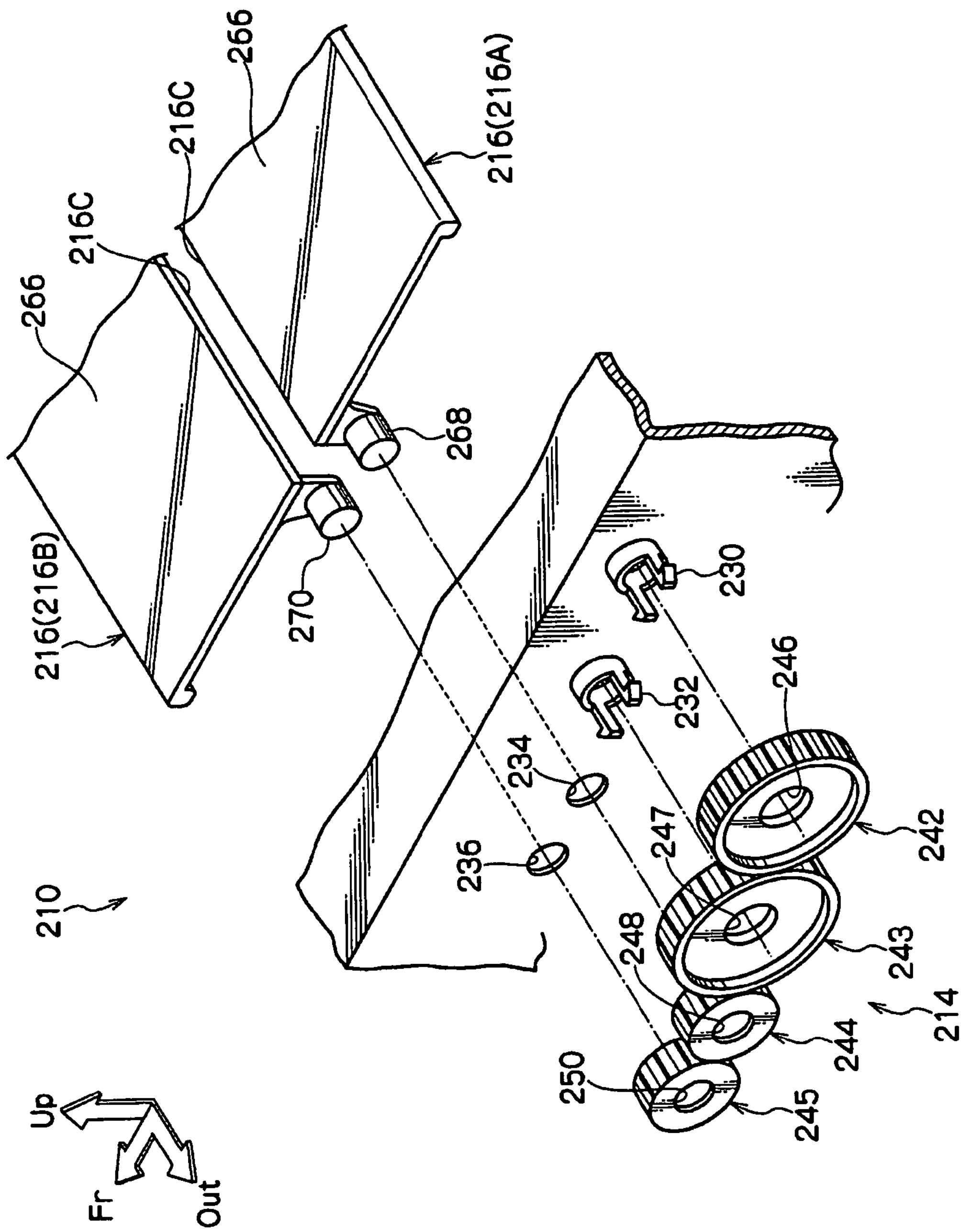
FIG. 17 is an exploded perspective view showing the configuration of an up-down delivery direction altering mechanism and a pair of fins according to the third exemplary embodiment of the present invention.
Figure 18:
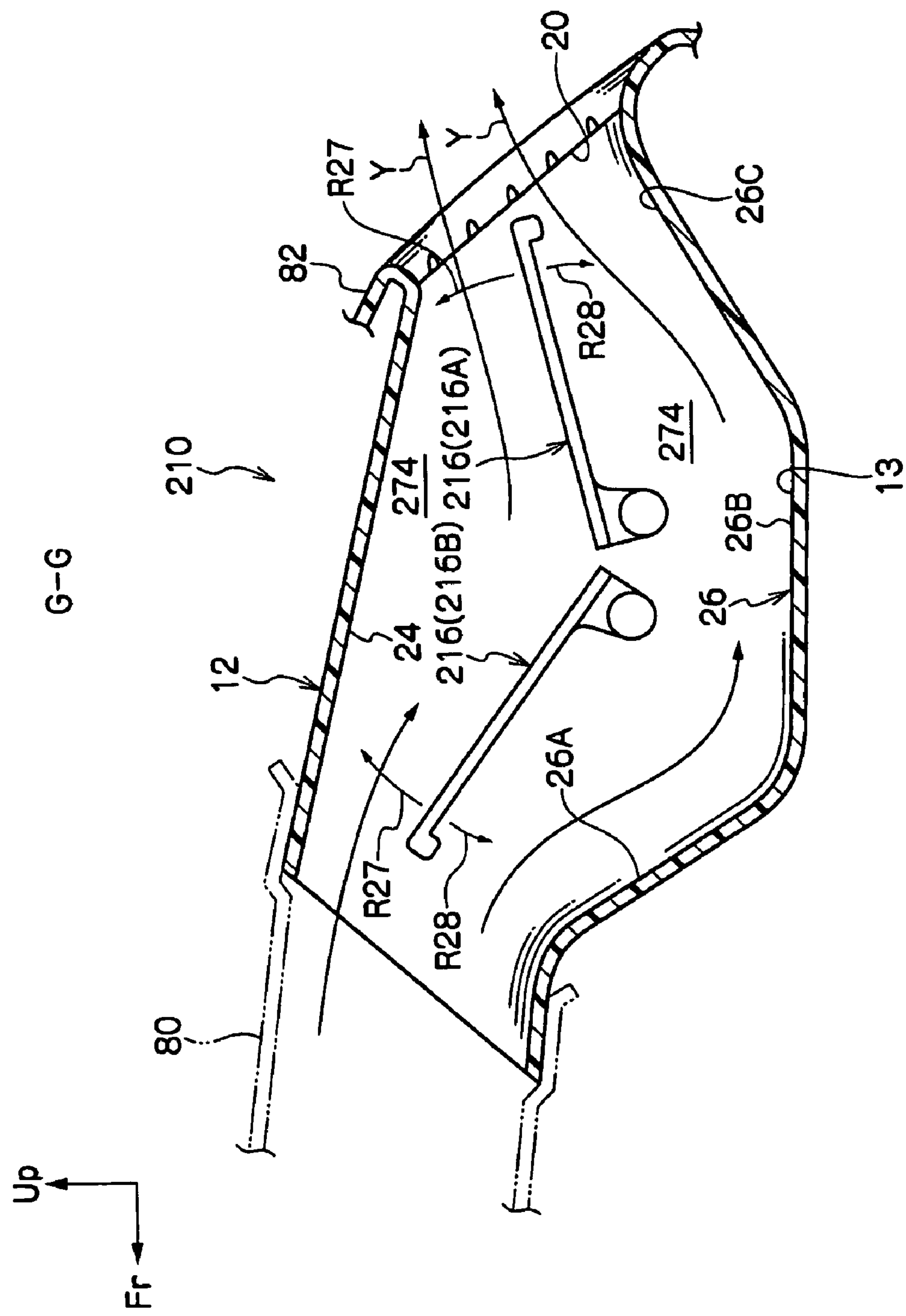
FIG. 18 is a cross-sectional diagram for explaining the operation of the pair of fins according to the third exemplary embodiment of the present invention (a cross-section taken on line G-G of FIG. 16).
Figure 19:
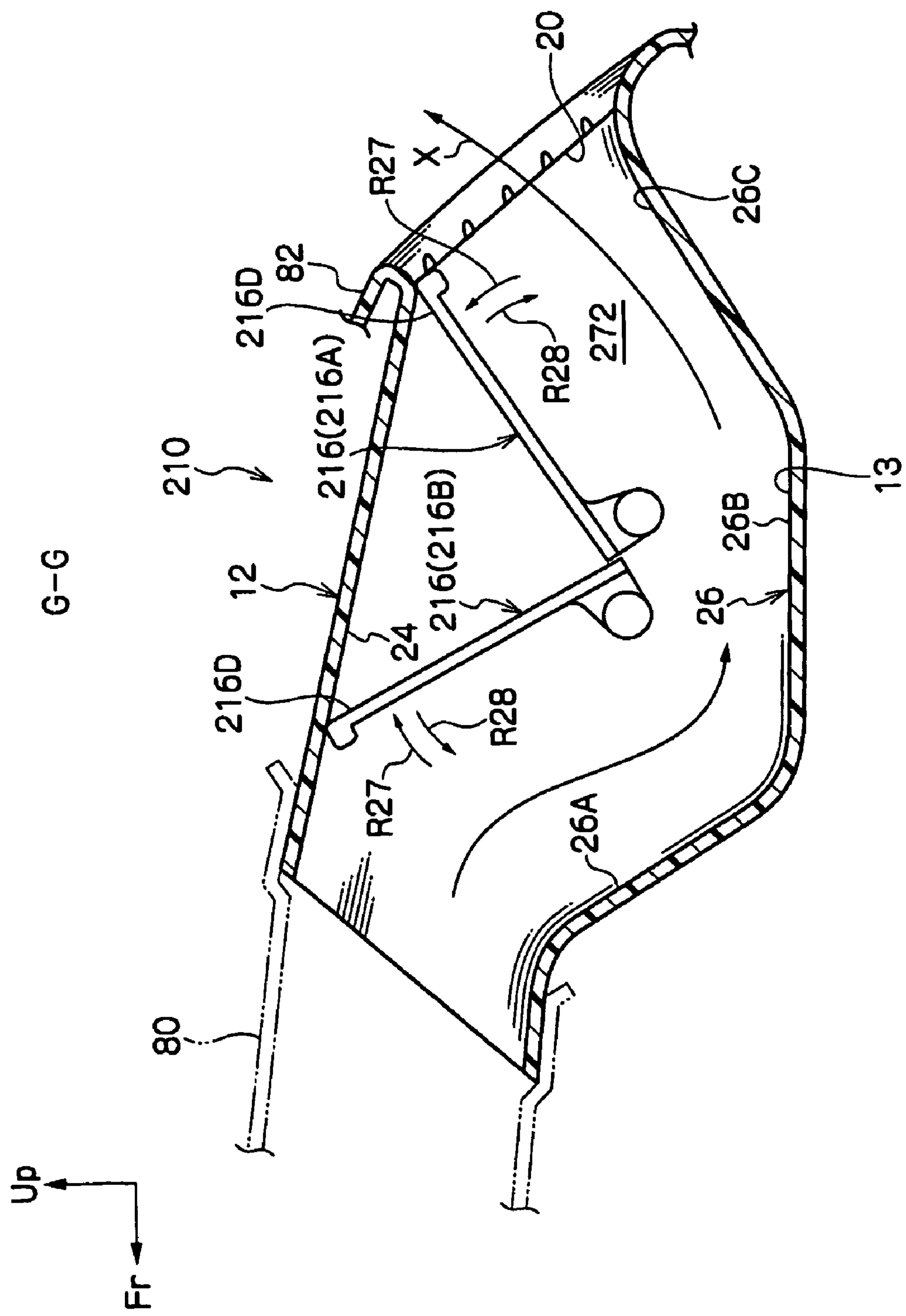
FIG. 19 is a cross-sectional diagram for explaining the operation of the pair of fins according to the third exemplary embodiment of the present invention (a cross-section taken on line G-G of FIG. 16).
Figure 20:
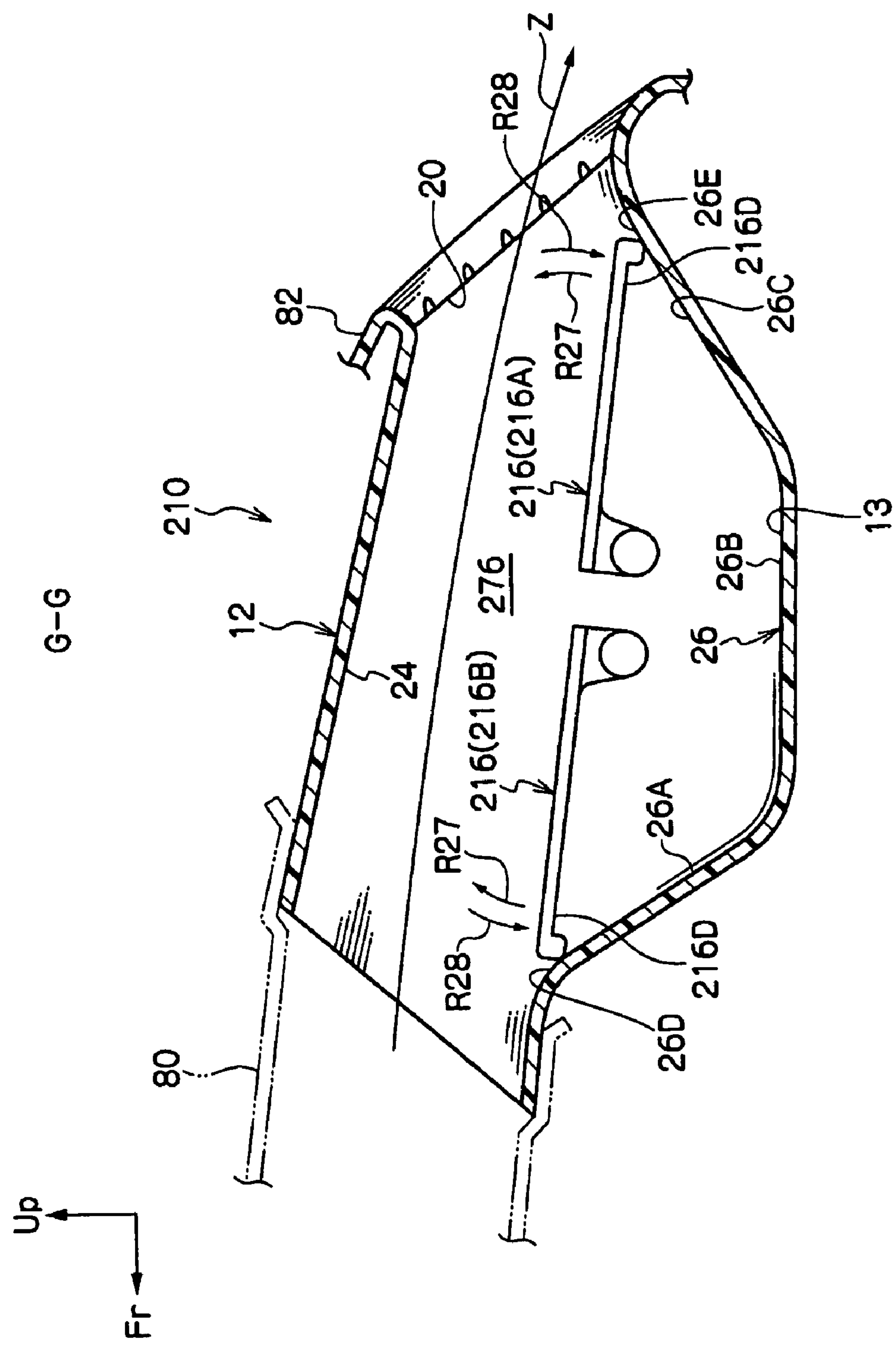
FIG. 20 is a cross-sectional diagram for explaining the operation of the pair of fins according to the third exemplary embodiment of the present invention (a cross-section taken on line G-G of FIG. 16).
Figure 21:
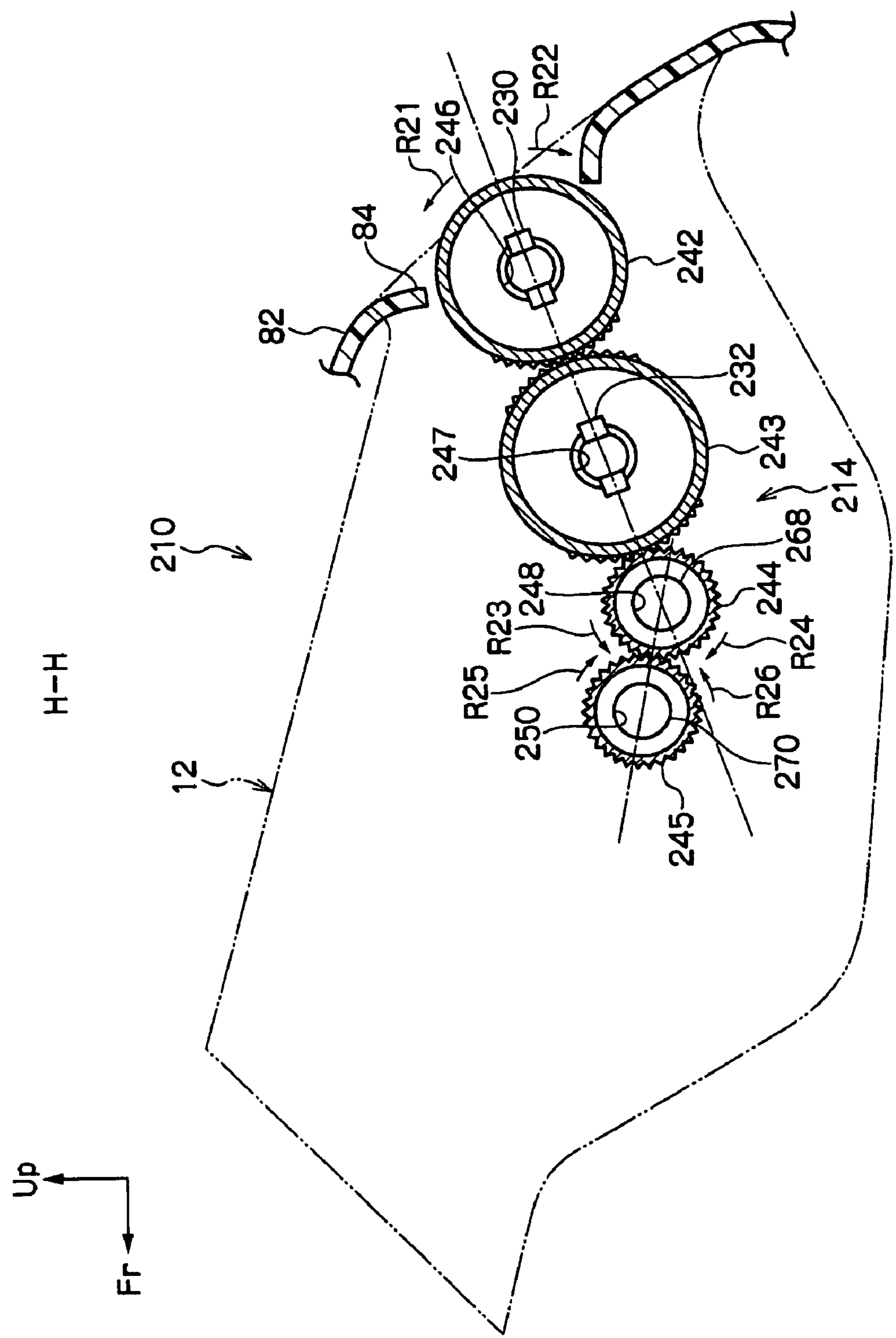
FIG. 21 is a cross-sectional diagram taken on line H-H of FIG. 16.
Figure 22:
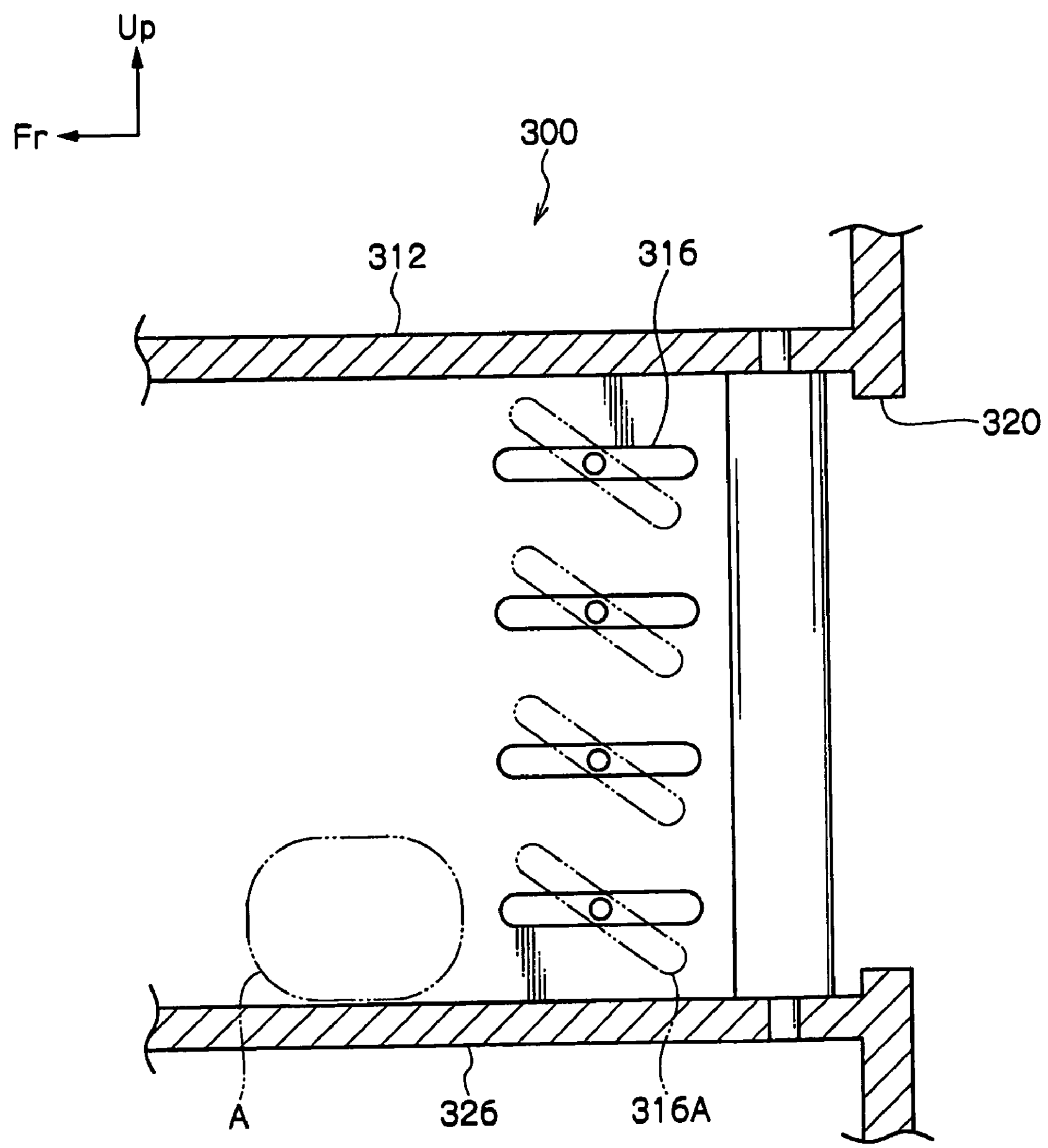
FIG. 22 is a cross-sectional diagram showing an air conditioner air outlet structure according to a comparative example.

The invention claimed is:

1. An air outlet structure of an air conditioner, the air outlet structure comprising:

a flow path member, opened at the downstream end thereof as an air outlet for an air conditioning air stream to a vehicle compartment, a top wall of the flow path member being inclined downward in a vehicle vertical direction toward the a flow direction downstream side of the air conditioning air stream, an upstream face of a bottom wall is of the flow path member being inclined downward upward on progression in the vehicle vertical direction toward the flow direction downstream side of the air conditioning air stream, an intermediate face that is continuous with the upstream face being provided horizontally so as to extend along the vehicle front-rear direction, and a downstream face that is continuous from the intermediate face toward the air outlet being inclined upward in the vehicle vertical direction toward the downstream side;

a pair of fins, provided one on top of another in the vehicle vertical direction within the flow path member at a middle portion in the flow direction of the air conditioning air stream, with upstream side ends thereof being rotatably supported with respect to the flow path member; and a delivery direction altering part that, being coupled to an operation portion and the pair of fins, changes states of the pair of fins such that:

when the pair of fins are swung upward so as to form an upward facing flow path between the pair of fins and the downstream face of the bottom wall, each of the pair of fins is relatively swung toward the other;

when the pair of fins are positioned at a vertically intermediate position so as to form a horizontally directed flow path with the top wall and the bottom wall, each of the pair of fins is relatively swung away from the other so as to allow air to pass therebetween; and when the pair of fins are swung downward so as to form a downward directed flow path between the pair of fins and the top wall, each of the pair of fins is relatively swung toward the other.

2. The air conditioner air outlet structure of claim 1, wherein the pair of fins are configured such that the upstream side ends thereof are separated from each other in the vehicle vertical direction, and the air conditioning air stream passes between the fins when the fins are positioned at the vertically intermediate position.

3. An air outlet structure of an air conditioner, the air outlet structure comprising:

a flow path member, opened at a downstream end thereof as an air outlet for an air conditioning air stream to a vehicle compartment, a top wall of the flow path member being inclined downward in a vehicle vertical direction toward a flow direction downstream side of the air conditioning air stream, an upstream face of a bottom wall of the flow path member being inclined downward in the vehicle vertical direction toward the flow direction downstream side of the air conditioning air stream, an intermediate face that is continuous with the upstream face being provided horizontally so as to extend along the vehicle front-rear direction, and a downstream face that is continuous from the intermediate face toward the air outlet being inclined upward in the vehicle vertical direction toward the downstream side;

a pair of fins, provided one on top of another in the vehicle vertical direction within the flow path member at a middle portion in the flow direction of the air conditioning air stream, with upstream side ends thereof being rotatably supported with respect to the flow path member; and a delivery direction altering part that, being coupled to an operation portion and the pair of fins, changes states of the pair of fins such that:

the pair of fins are swung upward so as to form an upward facing flow path with the downstream face of the bottom wall, and each of the pair of fins is relatively swung away from the other;

the pair of fins are positioned at a vertically intermediate position so as to form a horizontally directed flow path with the top wall and the bottom wall, and each of the pair of fins is relatively swung toward the other; and the pair of fins are swung downward so as to form a downward directed flow path with the top wall, and each of the pair of fins is relatively swung away from the other.

* * * * *